United States Patent
McGrew

(10) Patent No.: US 12,099,212 B2
(45) Date of Patent: Sep. 24, 2024

(54) THREE-DIMENSIONAL FIBER PLATE DISPLAY

(71) Applicant: Vuzix Corporation, West Henrietta, NY (US)

(72) Inventor: Stephen P. McGrew, Spokane, WA (US)

(73) Assignee: Vuzix Corporation, West Henrietta, NY (US)

( * ) Notice: Subject to any disclaimer, the term of this patent is extended or adjusted under 35 U.S.C. 154(b) by 107 days.

(21) Appl. No.: 17/745,826

(22) Filed: May 16, 2022

(65) Prior Publication Data
US 2022/0365362 A1   Nov. 17, 2022

Related U.S. Application Data

(60) Provisional application No. 63/188,630, filed on May 14, 2021.

(51) Int. Cl.
| | |
|---|---|
| G02B 30/50 | (2020.01) |
| G02B 27/01 | (2006.01) |
| G02B 27/02 | (2006.01) |
| G02B 27/09 | (2006.01) |
| G02B 30/27 | (2020.01) |

(52) U.S. Cl.
CPC .......... *G02B 30/50* (2020.01); *G02B 27/026* (2013.01); *G02B 27/0961* (2013.01); *G02B 27/0994* (2013.01); *G02B 30/27* (2020.01); *G02B 27/0172* (2013.01)

(58) Field of Classification Search
CPC .............. G02B 27/017; G02B 27/0172; G02B 27/026; G02B 27/0961; G02B 27/0994; G02B 30/27; G02B 30/30
See application file for complete search history.

(56) References Cited

U.S. PATENT DOCUMENTS

| | | |
|---|---|---|
| 5,311,611 A | 5/1994 | Migliaccio |
| 8,488,257 B2 | 7/2013 | Stark |

(Continued)

OTHER PUBLICATIONS

JianLei Zhang, XiaoRui Wang, XiongXiong Wu, Chen Yang, and YuJiao Chen, "Wide-viewing integral imaging using fiber-coupled monocentric lens array," Opt. Express 23, 23339-23347 (2015) (Year: 2015).*

(Continued)

*Primary Examiner* — Chineyere D Wills-Burns
*Assistant Examiner* — Cory A Almeida
(74) *Attorney, Agent, or Firm* — Harter Secrest & Emery LLP; Jacob D. Merrill, Esq.

(57) ABSTRACT

An image display device, including a light-emitting pixel array operable to emit a plurality of two-dimensional images each comprising a plurality of pixels; a light field converter comprising a coherent optical fiber plate including a plurality of optical fibers, wherein the optical fiber plate has a first surface and a second surface, and an array of lenslets arranged along the second surface, wherein the array of lenslets is configured to have a focal surface conforming to the second surface of the optical fiber plate; wherein the light field converter is operable to transform pixels from each of the plurality of two-dimensional images into corresponding diverging rays; wherein the diverging rays form virtual three-dimensional image in an image-forming region.

20 Claims, 25 Drawing Sheets

(56) References Cited

U.S. PATENT DOCUMENTS

| | | | |
|---|---|---|---|
| 10,606,092 B1* | 3/2020 | Lauer | G02B 30/27 |
| 2015/0207990 A1 | 7/2015 | Ford et al. | |
| 2018/0284441 A1 | 10/2018 | Cobb | |
| 2021/0026154 A1* | 1/2021 | Hong | G02B 3/0056 |
| 2022/0046225 A1* | 2/2022 | Arieli | H04N 13/324 |

OTHER PUBLICATIONS

Chao et al. (2015) "DNA-based plasmonic nanostructures," Materials Today 18(6): 326-335.

Flores et al. (2004) "Achromatic Hybrid Refractive-Diffractive Lens with Extended Depth of Focus, " Appl. Opt. 43(30): 5618-5630.

Hamamatsu Photonics K.K. (2013) "Direct Image Transmission—Fiber Optic Plates," 1-3.

Kim et al. (Jul. 2020) "One-step vapor-phase synthesis of transparent high refractive index sulfur- containing polymers," Sci. Adv. 6(28): 1-8.

Li et al. (2006) "Block Copolymer Patterns and Templates," Materials Today 9(9): 30-39.

Samaddar et al. (2018) "An engineering insight into block copolymer self-assembly: Contemporary application from biomedical research to nanotechnology," Chemical Engineering Journal 342: 71-89.

Stamenov et al. (2014) "Broad-spectrum fiber-coupled monocentric lens imaging," Classical Optics IM38.5, 1-2.

Stamenov (2014) "Panoramic monocentric lens imaging," University of California San Diego, Dissertation, 171 pages.

Takafuji et al. (2019) "Preparation of High Refractive Index Composite Films Based on Titanium Oxide Nanoparticles Hybridized Hydrophilic Polymers," Nanomaterials 9(4): 514, 9 pages.

* cited by examiner

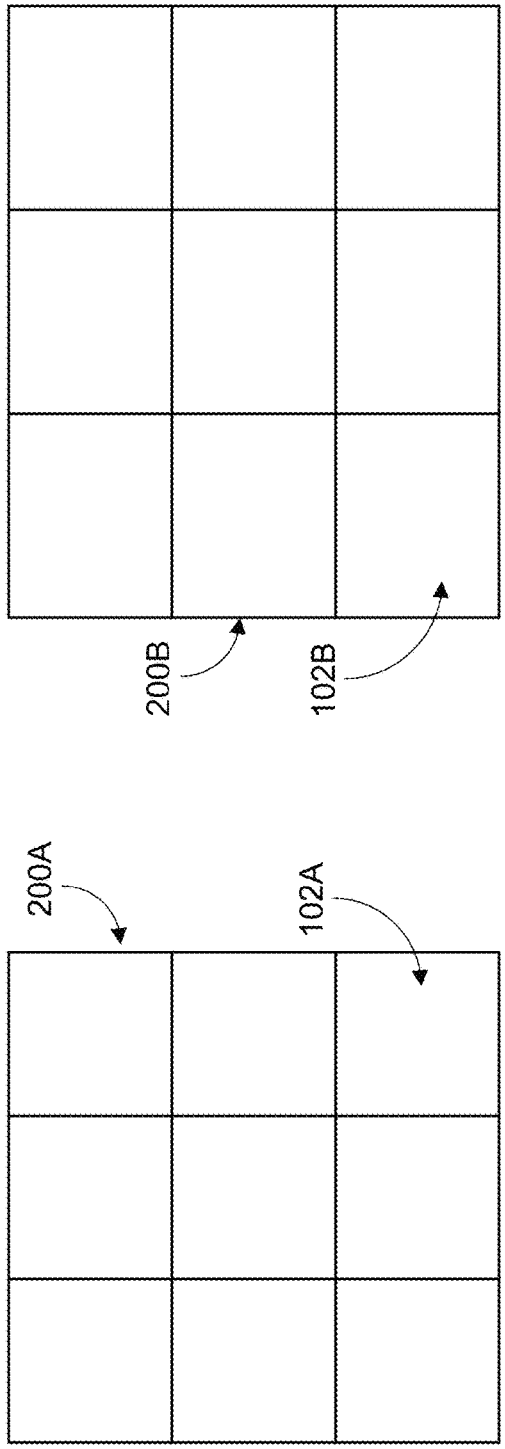
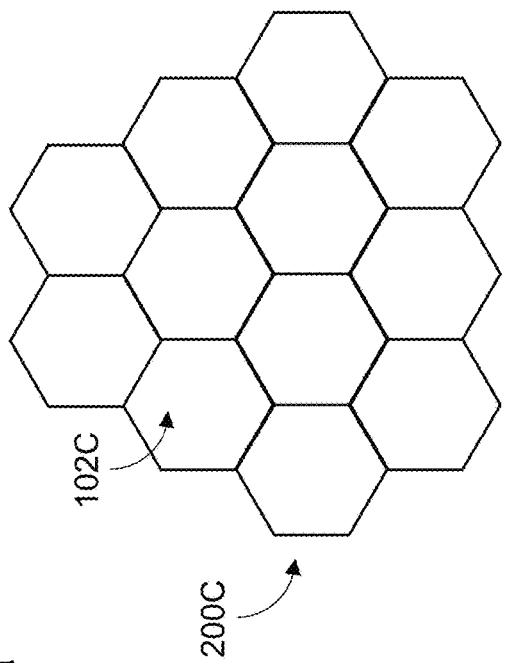
FIG. 12A
FIG. 12B
FIG. 12C

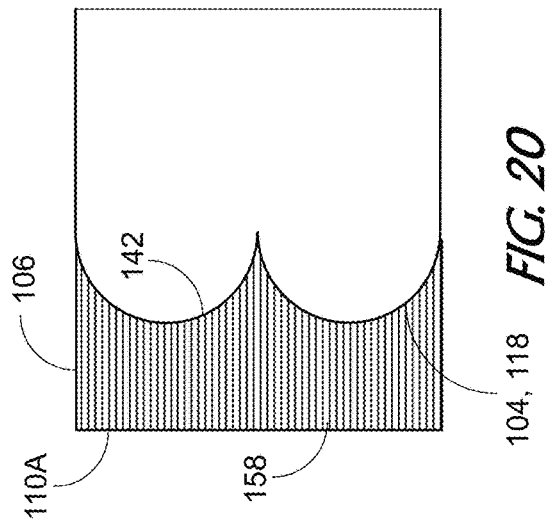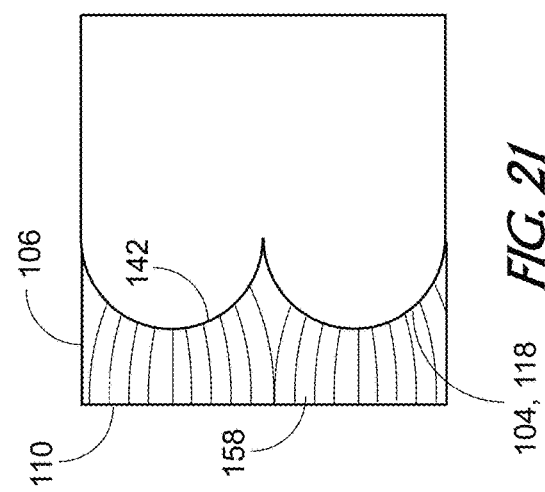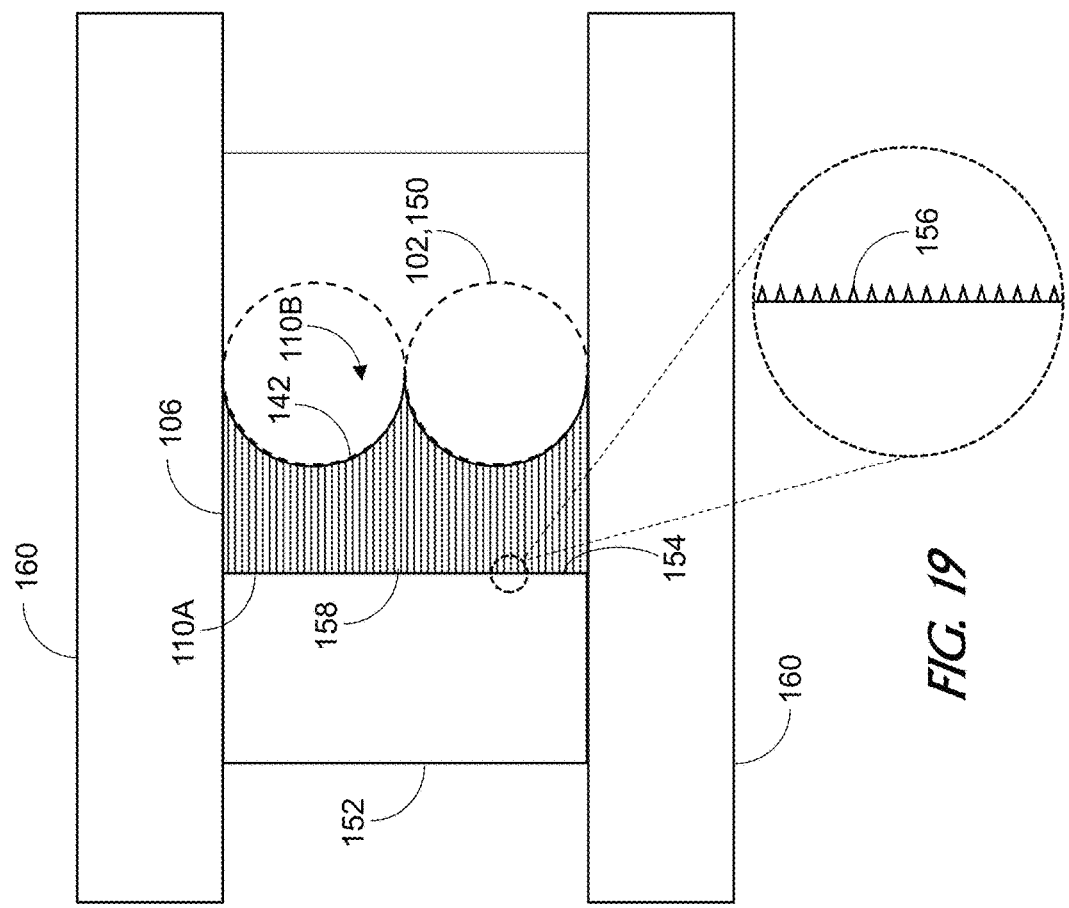

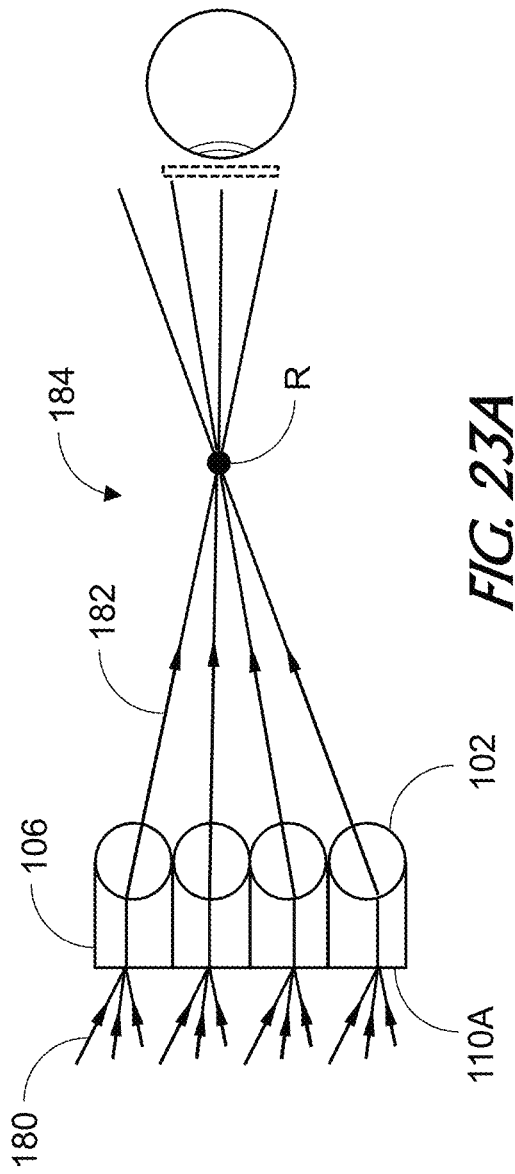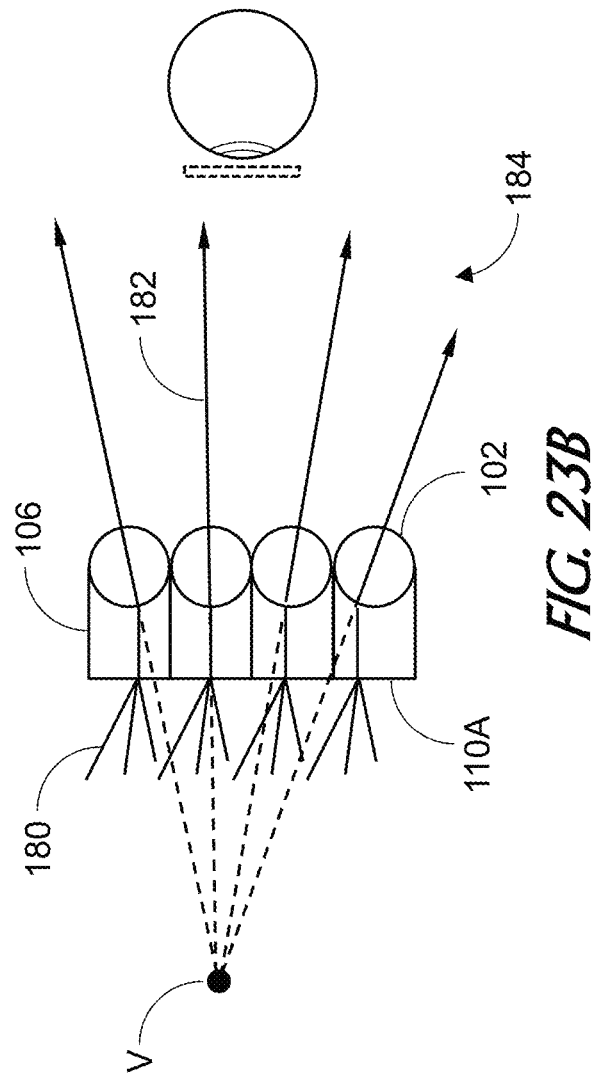

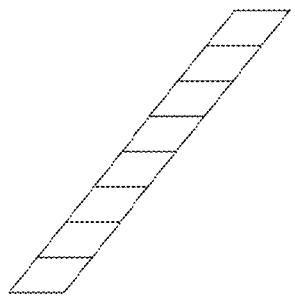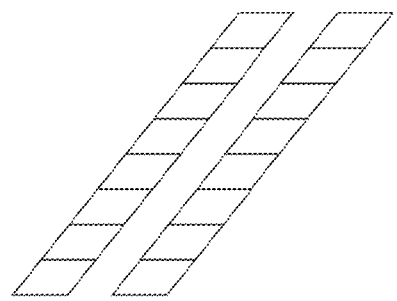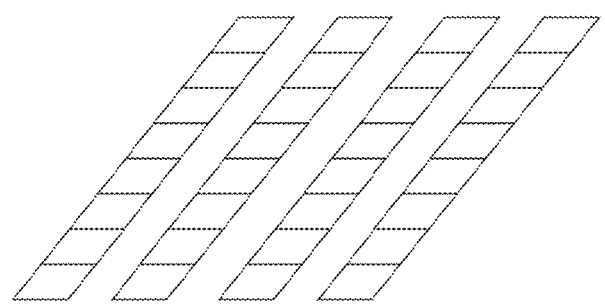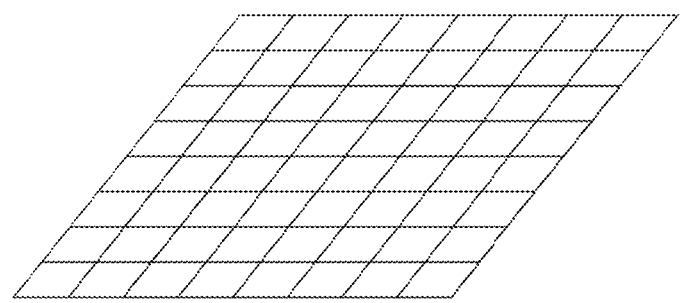
FIG. 26

THREE-DIMENSIONAL FIBER PLATE DISPLAY

TECHNICAL FIELD

The presently disclosed subject matter relates generally to an electronic display worn by a viewer for forming a virtual image in augmented reality, mixed reality, and virtual reality systems, and more particularly to a light field converter plate operable to transform an array of two-dimensional ("2D") images into a three-dimensional ("3D") light field.

BACKGROUND

There are many conventional approaches to the challenge of displaying 3D images for augmented reality, mixed reality, virtual reality, and the like. A conventional stereoscopic approach typically employs one virtual image display for each eye, and each display typically projects a 2D image that appears to be a fixed distance from the eye. The primary distance cue in a stereoscopic 3D display is the angular separation of the displayed images, so the human visual system experiences a conflict between the distance cue of angular separation and the distance at which the eye must focus. However, the conflict between the distance cue of angular separation and the distance at which the eye must focus often causes discomfort (e.g., headaches) in users.

In another conventional approach, a simple light field projects, for each eye, a collimated beamlet corresponding to each pixel on a virtual screen at infinity. The simple light field approach is effectively the same as a stereoscopic display.

A more advanced conventional light field approach employs an array of beamlet sources in which each beamlet source can project a divergent set of collimated beamlets from a region on a surface. An array of beamlet sources can project the virtual image of a voxel (i.e., a pixel in a 3D space) to any desired location in an image-forming region by ensuring that a beamlet from each source passes through the location of the voxel. This more advanced light field approach has the advantage that it, ideally, does not cause the visual system conflict caused by a stereoscopic approach.

A common way to construct a light field projector is to provide an array of lenslets, and to project onto the rear focal plane of each lenslet a 2D image. Each 2D image is converted by the corresponding lenslet into a divergent set of collimated beamlets, and convergence of the beamlets to voxels results in projection of a 3D image when, and if, the 2D images correspond to views of the 3D scene from their corresponding locations in the lenslet array.

A limitation of conventional light field projectors is that the focal surface of a single lenslet is not flat. As a result, the useful field of view ("UFOV") of a lenslet is relatively narrow. The present disclosure provides a light field projector that, although using a lenslet array, does not suffer from the same curved focal surface limitation and therefore does not suffer from the same narrow UFOV limitation as conventional light field projectors.

Monocentric image capture systems, such as, endoscopic cameras and panoramic cameras may utilize a ball lens with one or more coherent fiber bundles whose ends are conformal to the curved focal plane of the ball lens. The fiber bundles transfer the received image to a flat surface, or to multiple flat surfaces, for detection by a camera sensor array.

However, utilizing a fiber-optic face plate, conformal to the back focal surface of a ball lens or a lenslet array, to transfer imagery from a display surface to a ball lens or lenslet array in a 3D image projection system, is unknown in the art. This innovation provides an exceptionally wide field of view along with the ability to partially correct color aberrations.

Additionally, the present disclosure provides an inexpensive way to manufacture the key elements of the light field projector in such a 3D image projection system, and provides a computationally efficient way to determine the set of 2D images required to produce a given 3D image.

SUMMARY

In a first exemplary embodiment, the present disclosure provides a coherent fiber optic plate and a micro-lens array operable to transform an array of two-dimensional images into a three-dimensional light field. In an exemplary embodiment, an image display device includes a light-emitting pixel array operable to emit a plurality of two-dimensional images each comprising a plurality of pixels. The image display device includes a light field converter having a coherent optical fiber plate including a plurality of optical fibers, wherein the optical fiber plate has a first surface and a second surface, and an array of lenslets arranged along the second surface, wherein the array of lenslets is configured to have a focal surface conforming to the second surface of the optical fiber plate. Wherein the light field converter is operable to transform pixels from each of the plurality of two-dimensional images into corresponding diverging rays, and wherein the diverging rays form virtual three-dimensional image in an image-forming region.

In an embodiment, each lenslet of the lenslet array includes a spherical surface in contact with one or more ends of the plurality of optical fibers, each lenslet having a refractive index operable to conform the focal surface to the spherical surface of each lenslet.

In an embodiment, each lenslet comprises a portion of a spherical microlens having a refractive index of approximately 2.0.

In an embodiment, each lenslet comprises a diffractive structure on the spherical surface optically adjacent to the image-forming region, wherein the diffractive structure is operable to correct at least a portion of chromatic aberrations caused by a material of the lenslet.

In a second exemplary embodiment, the present disclosure provides a method of determining the two-dimensional image arrays required to produce a three-dimensional image or video. In an exemplary embodiment, a method for projecting three-dimensional images includes providing a light-emitting pixel array operable to emit a plurality of two-dimensional images each having a plurality of pixels. The method providing a first light field converter including a first coherent optical fiber plate, wherein the first optical fiber plate has a first surface and a second surface, and a first array of lenslets arranged along the second surface, wherein the first array of lenslets is configured to have a focal surface conforming to the first surface of the first optical fiber plate. Wherein the first light field converter is operable to transform pixels from each of the plurality of two-dimensional images into corresponding diverging rays, and wherein the diverging rays form a virtual three-dimensional image in an image-forming region. The method including constructing a first look-up table containing information corresponding to locations of the plurality of pixels on the first surface of the first optical fiber plate as a result of illuminating the second surface of the first optical fiber plate from individual points at a plurality of parallel planes within the image-forming region. The method including representing a three-dimensional image as a set of the individual points, and using the look-up table to determine the locations of the plurality of pixels of the two-dimensional images to project via the light-emitting pixel array onto the first surface of the first optical fiber plate, whereby the first optical fiber plate is operable to convert the plurality of two-dimensional images into the three-dimensional image.

In an embodiment, the method includes constructing a series of the plurality of two-dimensional images to provide a three-dimensional video sequence. In an embodiment, at least one of the three-dimensional images of the three-dimensional video sequence is confined to a single plane within the image-forming region.

In an embodiment, the method includes providing a second light field converter comprising a second coherent optical fiber plate, wherein the second optical fiber plate has a first surface and a second surface, and a second array of lenslets arranged along the second surface, wherein the second array of lenslets is configured to have a focal surface conforming to the first surface of the second optical fiber plate, wherein the second light field converter is arranged to mirror the first light field converter, and wherein the second light field converter is operable to transmit the plurality of rays and display the two-dimensional images on the first surface of the second optical fiber plate at a first distance from the first light field converter. The method including constructing a second look-up table containing information corresponding to locations of the plurality of pixels of the displayed two-dimensional images on the first surface of the second optical fiber plate at the first distance, representing a three-dimensional image as a set of the individual points, and using the first or second look-up table to determine the locations of the plurality of pixels of the two-dimensional images to project via the light-emitting pixel array onto the first surface of the first optical fiber plate, whereby the first optical fiber plate is operable to convert the plurality of two-dimensional images into the three-dimensional image.

In an embodiment, the two-dimensional images correspond to different perspective views of the three-dimensional image.

In an embodiment, the method includes translating the second light field converter to a second distance from the first light field converter, constructing a third look-up table containing information corresponding to locations of the plurality of pixels of the displayed two-dimensional images on the first surface of the second optical fiber plate at the second distance.

In an embodiment, the method includes averaging or combining the values from the second and third look-up tables to generate the three-dimensional image.

In an exemplary embodiment, a method of fabricating an image display device, includes providing a coherent optical fiber plate with a thickness between 10.0 millimeters and 0.05 millimeters, wherein the optical fiber plate has a first surface and an opposing second surface. The method including subtracting an array of hemispherical portions from the second surface of the optical fiber plate, wherein each of the hemispherical portions has a radius of curvature corresponding to a radius of curvature of a lenslet in an array of lenslets.

In an embodiment, the method includes arranging each lenslet of the array of lenslets in the array of hemispherical portions, wherein each lenslet of the array of lenslets includes a surface shape arranged to direct corresponding groups of rays at angles whose conical axes approximately converge toward an eyebox.

In an embodiment, the method includes providing a first mold portion having an array of hemispherical portions corresponding to the array of hemispherical portions in the second surface of the optical fiber plate, using the second surface of the optical fiber plate as a second mold portion, molding a high refractive index element having a surface adhered to the second surface of the optical fiber plate, wherein the high refractive index element forms an array of lenslets matingly engaged with the array of hemispherical portions in the optical fiber plate.

In an embodiment, the high refractive index element comprises a photo-curable resin impregnated with high refractive index nanoparticles.

In an embodiment the method includes providing a bottom mold having an array of nucleation features 0.1 nanometers to 50.0 nanometers high and spaced at a distance of 5.0 nanometers to 10.0 microns, and applying a layer of block copolymer between the bottom mold and a top mold, the block copolymer configured to self-assemble into columns perpendicular to a surface of the bottom mold having the nucleation features, the columns arranged according to a location of the nucleation features, wherein the columns form a fiber structure of the optical fiber plate.

In an embodiment each column comprises a high-index core with a lower-index sheath.

In an embodiment each column comprises a rigid high-index core with a sheath, the method further comprising applying a solvent to the optical fiber plate to remove the sheath forming an air gap between the columns.

In an embodiment the top mold comprises a surface corresponding to an inner surface of the array of lenslets.

In an embodiment the top mold comprises the array of lenslets, whereby the columns self-assemble to connect to the array of lenslets.

BRIEF DESCRIPTION OF THE DRAWING FIGURES

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

FIGS. 12A, 12B, 12C show schematic arrays of spherical lenslets according to embodiments of the present disclosure.

FIG. 19 shows a schematic of a portion of an apparatus and method of making a 3D light field converter according to an embodiment of the present disclosure.

FIG. 20 shows a schematic of a portion of an apparatus and method of making a 3D light field converter according to an embodiment of the present disclosure.

FIG. 21 shows a schematic of a portion of an apparatus and method of making a 3D light field converter according to an embodiment of the present disclosure.

FIGS. 23A and 23B show pixels projected onto the flat surface of the fiber optic plate according to an embodiment of the present disclosure.

FIG. 26 shows an approach to constructing the lookup table in a parallel fashion utilizing a 3D light field converter according to an embodiment of the present disclosure.

DETAILED DESCRIPTION

Figure 1:
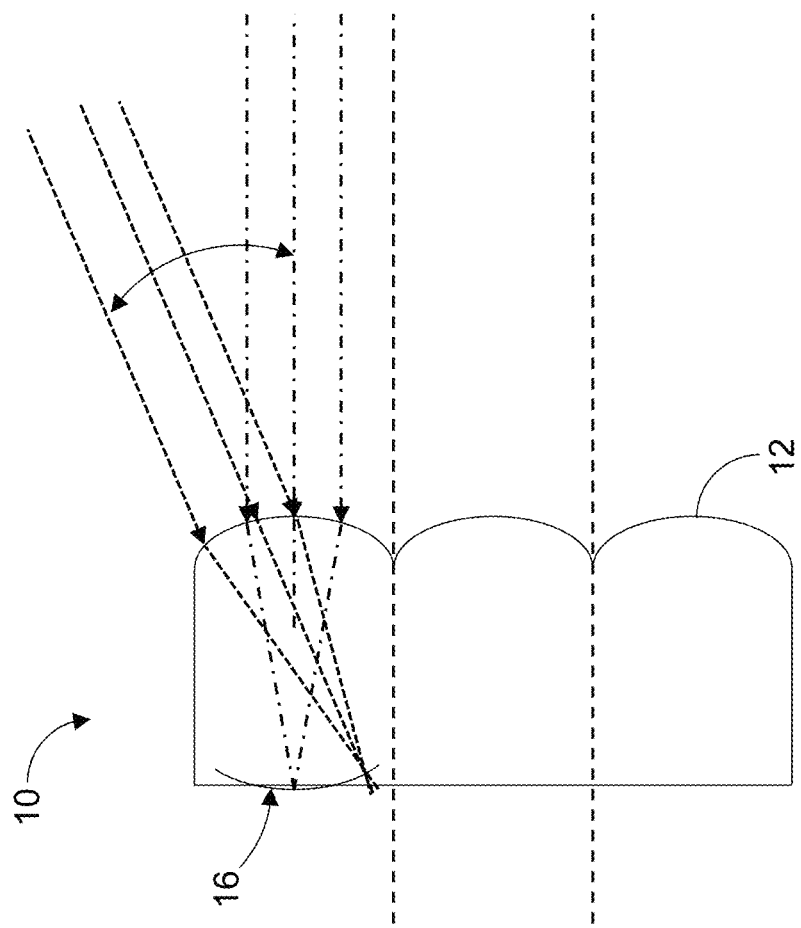
FIG. 1 shows a schematic of a conventional fly's eye lens imaging and/or projection system using conventional lenslets and the presence of spherical aberration and the resulting field of view limitations.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first", "second", and so on, do not necessarily denote any ordinal, sequential, or priority relation, but are simply used to more clearly distinguish one element or set of elements from another, unless specified otherwise.

Where they are used herein, the terms "viewer", "operator", "observer", and "user" are considered to be equivalent and refer to the person who views the virtual images through a near-eye viewing device.

Where they are used herein, the terms "coupled" or "coupler" (in the context of optics) refer to a connection by which light travels from one optical medium or device to another optical medium or device through an intermediate structure that facilitates the connection.

Where they are used herein, the terms "optical infinity" and "at infinity" correspond to conventional usage in the camera and imaging arts, indicating image formation using substantially collimated light, so that the focus distance exceeds at least about four meters (4 m).

As illustrated in FIG. 1, a conventional light field display 10 having an array of plano-convex lenslets 12 suffers from a limited UFOV due to lens aberrations which lead to a non-flat focal surface 16. A typical focal field distortion due to the non-flat focal surface 16, limits the UFOV according to the maximum acceptable size of the focal spot.

Figure 2:
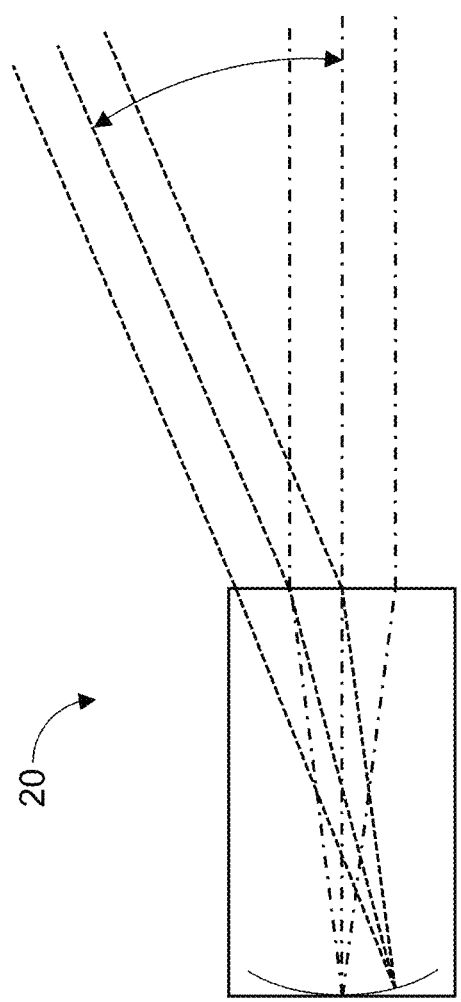
FIG. 2 shows a schematic of a conventional fly's eye lens imaging and/or projection system using gradient index cylinder lenses and the presence of spherical aberration and resulting field of view limitations.

As illustrated in FIG. 2, another conventional design utilizes gradient index rod lenses 20 to form a 3D image from an array of 2D images. Like plano-convex lenslets, the gradient index rod lenses 20 suffer from aberrations and a limited UFOV.

Figure 3:
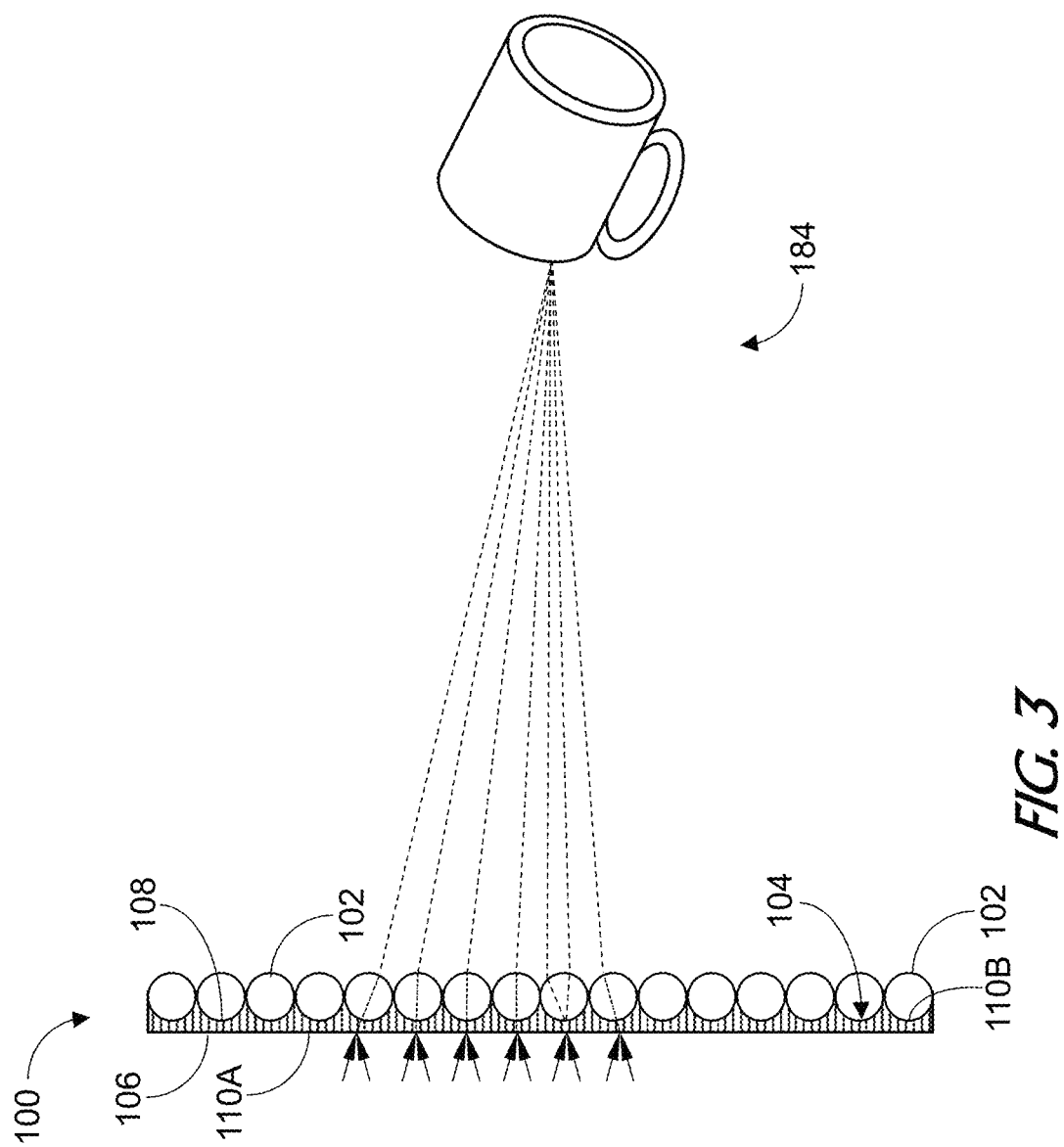
FIG. 3 shows a schematic of a 3D image projection system having a spherical lenslet array according to an exemplary embodiment of the present disclosure.

It is advantageous to have a flat focal plane and wide field of view in a light field converter to minimize complexity and manufacturing cost, and to maximize usefulness. As illustrated in FIG. 3, in an example embodiment, a 3D image projection system 100 includes an array of spherical microlenses 102 having a focal surface 104 at a first surface 108 (i.e., the "back" surface generally opposite an image-forming region 184) of the spherical microlenses 102. The spherical microlenses 102 may also be referred to as lenslets 102 herein. The spherical microlenses 102 are configured to achieve a flat focal plane and a wide field of view. The array of lenslets 102 is in contact with, or substantially contacts, a coherent optical fiber plate 106 having first and second opposing surfaces 110A, 110B. The optical fiber plate 106 may also be referred to herein as a fiber optic plate. The first surface 110A of the optical fiber plate 106 is generally flat and the second surface 110B of the optical fiber plate 106 conforms to the array of lenslets 102. For example, the optical fiber plate 106 includes a plurality of optical fibers arranged in parallel such that the optical fibers are generally perpendicular to the first surface 110A. The optical fibers may also be referred to herein as columns. The focal surface 104 of the microlenses 102 is transferred to a flat surface via the optical fiber plate 106. In the example shown in FIG. 3, the first surface 108 of the microlenses 102 is in contact with the second surface 110B of the optical fiber plate 106, and the focal surface 104 of the microlenses 102 is transferred to the first surface 110A of the optical fiber plate 106. The 3D image projection system 100 may also be referred to herein as a 3D light field converter 100. An image display device may comprise the 3D light field converter 100.

Figure 4:
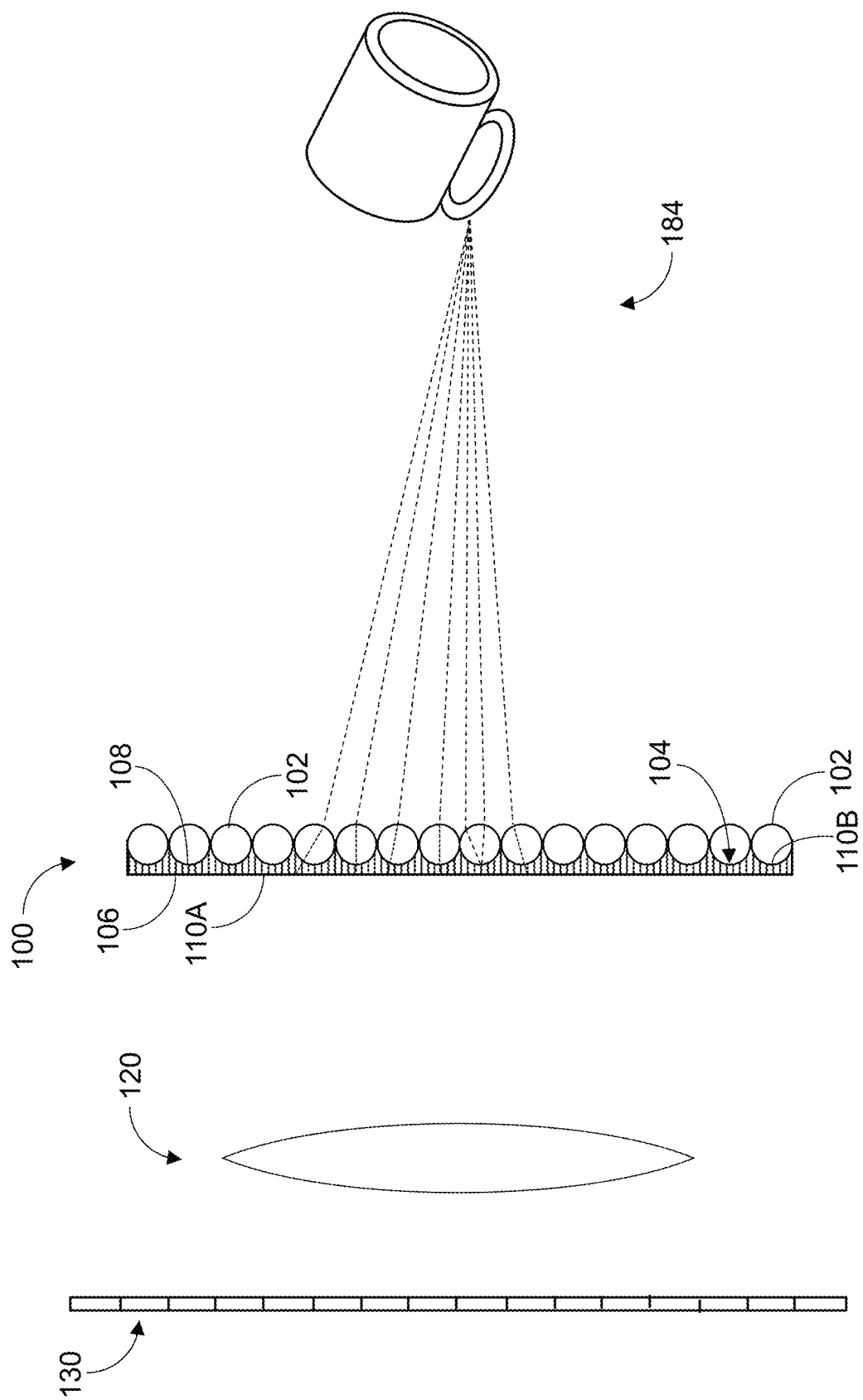
FIG. 4 shows a schematic of a 3D image projection system having a spherical lenslet array and a lens system according to an exemplary embodiment of the present disclosure.
Figure 5:
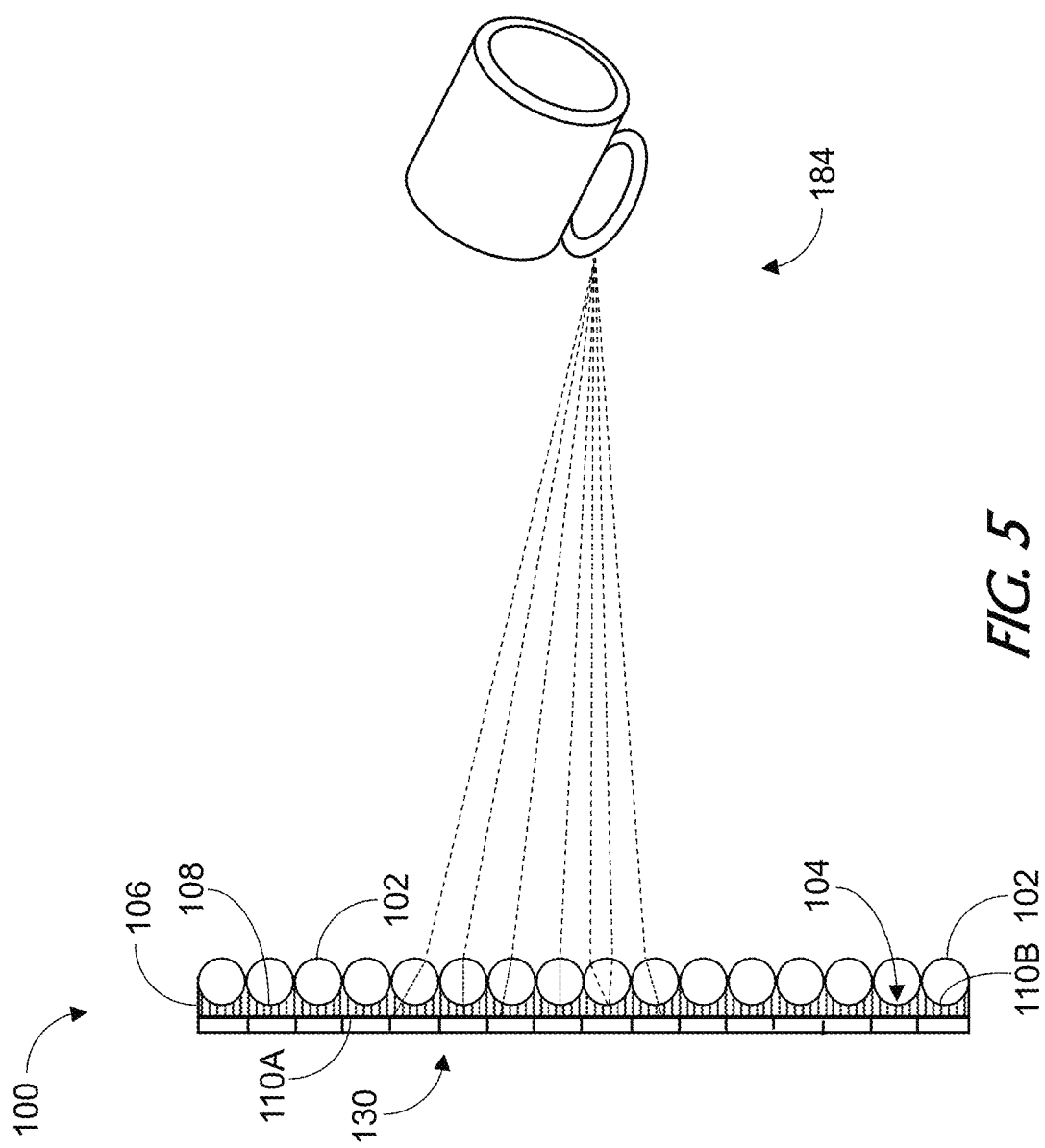
FIG. 5 shows a schematic of a 3D image projection system having a spherical lenslet array and a light-emitting pixel array according to an exemplary embodiment of the present disclosure.

With continued reference to FIG. 3, a 2D image projected onto the first surface 110A of the fiber optic plate 106 is formed into a 3D image. In an embodiment, as illustrated in FIG. 4, the 3D light field converter 100 includes a light-emitting pixel array 130 and a lens system 120 operable to convey 2D images from the light-emitting pixel array 130 to the fiber optic plate 106. In an example embodiment, as illustrated in FIG. 5, the light-emitting pixel array 130 is in contact with the flat side 110 of the fiber optic plate 106. Each 2D image emitted by the light-emitting pixel array 130 includes a plurality of pixels. The 3D light field converter 100 is operable to transform pixels from each of the plurality of 2D images into corresponding diverging rays, wherein the diverging rays form a real or virtual 3D image in the image-forming region 184. A virtual 3D image formed of diverging rays in the image-forming region 184 produces a virtual image appearing at a predetermined distance in front of a viewer's eye from within the eyebox E. Utilizing a control unit, the 3D light field converter 100 is operable transform a series of 2D images to provide a 3D video sequence. In an example embodiment, at least one of the 3D images of the 3D video sequence is confined to a single plane within the image-forming region 184.

Figure 6:
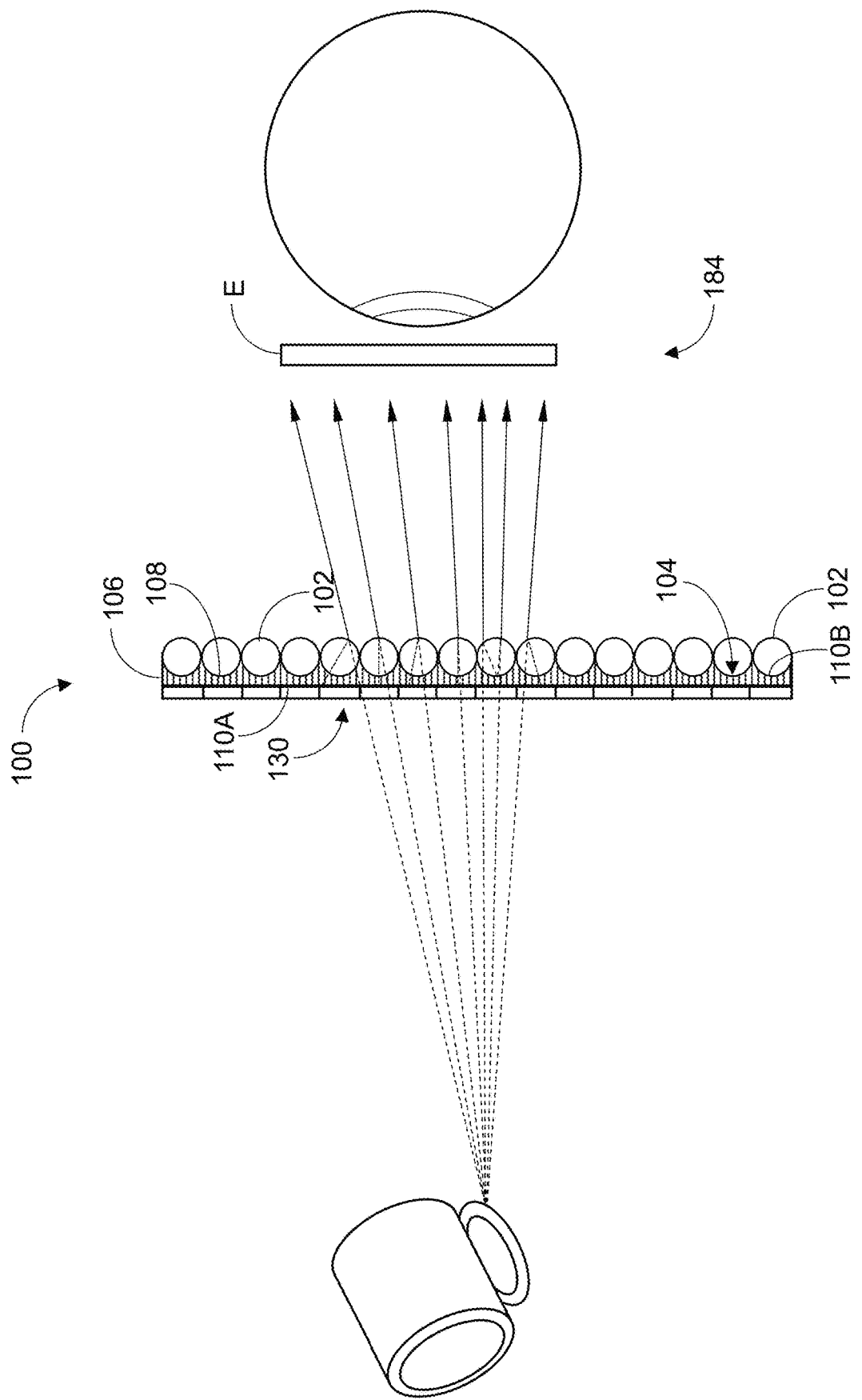
FIG. 6 shows a schematic of the 3D image projection system according to FIG. 5 projecting a virtual 3D image.

As illustrated in FIG. 6, the 3D light field converter 100 having the light-emitting pixel array 130 is operable to produce a virtual 3D image. It should be noted that there is no need for any ray bundles projected by the 3D light field converter 100 to fall outside of the eyebox E, because those rays falling outside of the eyebox E will not be visible. Therefore, the field of view ("FOV") of each individual lenslet 102 can be substantially smaller than the desired FOV of the entire 3D light field converter 100.

Figure 7:
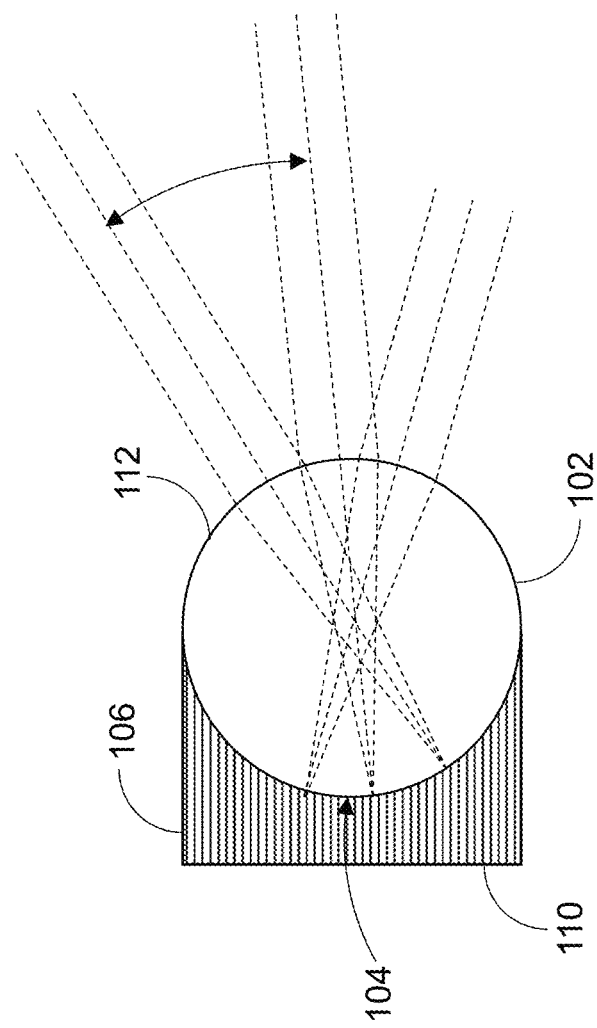
FIG. 7 shows a schematic of an individual lenslet of the 3D image projection system according to FIG. 5.

As illustrated in FIG. 7, in an embodiment, the individual lenslets 102 have a substantially spherical shape. If the refractive index of the lenslet 102 is substantially 2.0 and the outside surface 112 of the lenslet 102 is in contact with air whose refractive index is substantially 1.0, the focal surface 104 of the lenslets 102 is the back surface thereof.

Figure 9:
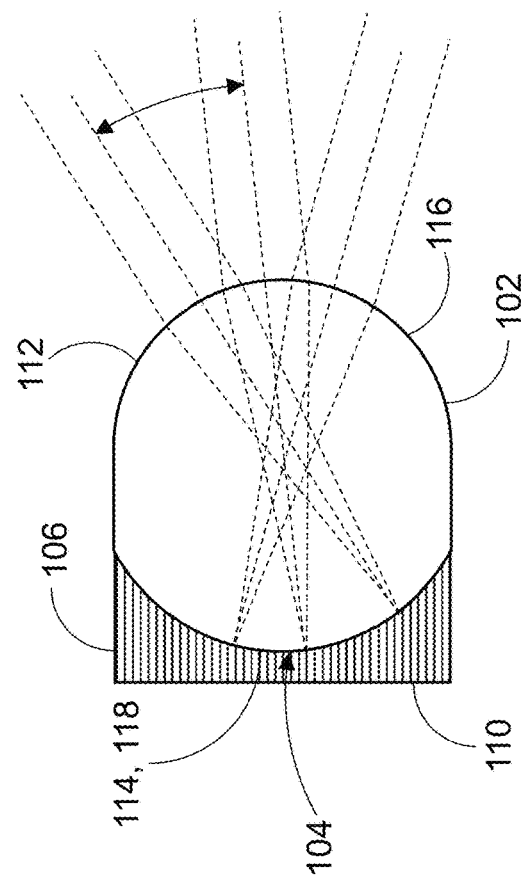
FIG. 9 shows a schematic of an individual lenslet of the 3D image projection system according to FIG. 8.
Figure 8:
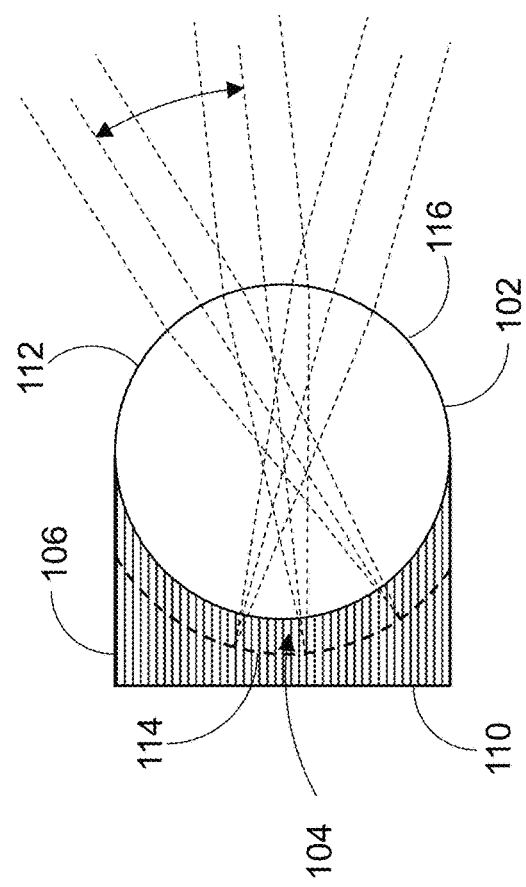
FIG. 8 shows a schematic of an individual lenslet of the 3D image projection system according to an embodiment of the present disclosure.

As illustrated in FIG. 8, if the refractive index of the lenslet 102 is lower than 2.0, the lenslet focal surface 104 is on a spherical surface 114 having a radius larger than that of the front surface 116 of the lenslet 102. As illustrated in FIG. 9, a lenslet 102 having a refractive index lower than 2.0 may accommodate the large focal surface 104 radius by having a back surface 118 with a larger radius than its front surface 116. Having a lenslet back surface 118 with a larger radius than its front surface 116 results in a reduced FOV.

Figure 11:
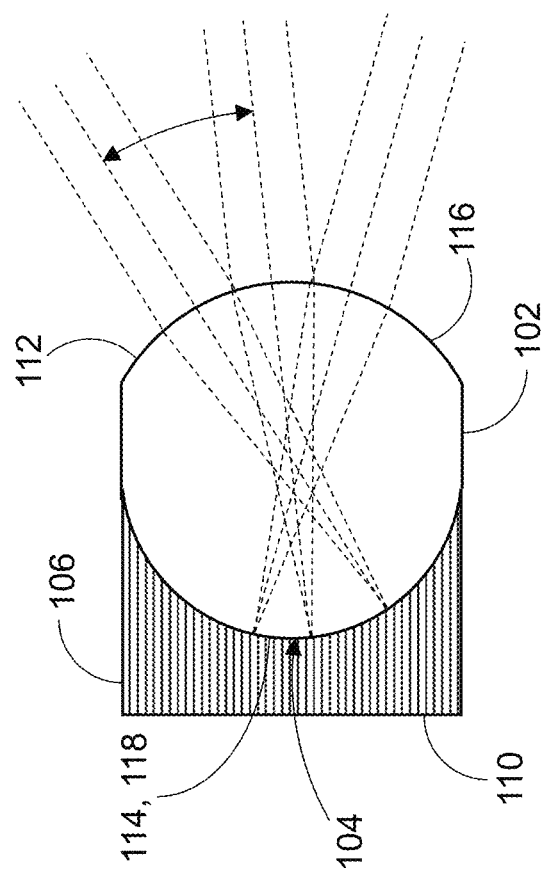
FIG. 11 shows a schematic of an individual lenslet of the 3D image projection system according to FIG. 10.
Figure 10:
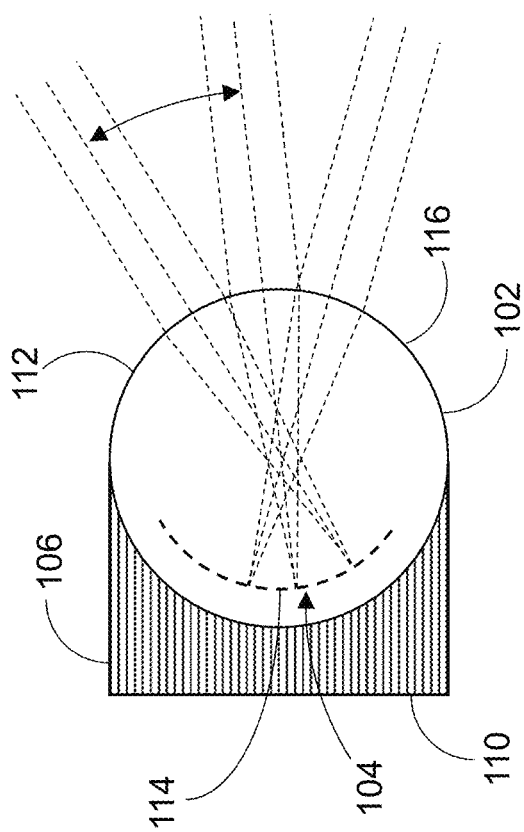
FIG. 10 shows a schematic of an individual lenslet of the 3D image projection system according to an embodiment of the present disclosure.

As illustrated in FIG. 10, if the refractive index of the lenslet 102 is greater than 2.0, the lenslet focal surface 104 is on a spherical surface 114 having a radius smaller than that of the front surface 116 of the lenslet 102. As illustrated in FIG. 11, a lenslet 102 having a refractive index greater than 2.0 may accommodate the smaller focal surface 104 radius by having a back surface 118 with a smaller radius than its front surface 116. Having a lenslet back surface 118 with a smaller radius than its front surface 116 results in a lower resolution.

Referring now to FIG. 12A, although a square array 200A of spherical lenslets 102 may seem to be a direct and practical structure for the 3D light field converter 100, a greater percentage of the surface of the 3D light field converter 100 may be used when lenslets 102 are packed in a hexagonal array 200C as illustrated in FIG. 12C. As illustrated in FIGS. 12A-12C, to achieve a one-hundred-percent (100%) packing fraction so that there is no unused surface on the 3D light field converter 100, the individual lenslets 102 may be shaped to fit a close-fitting square array 200A, rectangular array 200B, or hexagonal array 200C, having square, rectangular, and hexagonal lenslets 102A, 102B, 102C, respectively. The lenslet arrays 200A, 200B, 200C provide a compromise between wide FOV and optimum use of surface area of the 3D light field converter 100. The rectangular array 200B and hexagonal array 200C configurations provide the widest FOV in all directions.

In an embodiment of the 3D light field converter 100, the lenslets 102 are rectangular segments of spherical microlenses as illustrated in FIGS. 12A and 12B. Each lenslet 102 may be identical, or it may be a different segment of a spherical microlens 102, and positioned so that the fields of view of the different lenslets 102 are all centered on an eyebox E in order to use the field of view of each lenslet 102 with maximum efficiency, avoiding sending light to regions outside the eyebox E.

Figure 13:
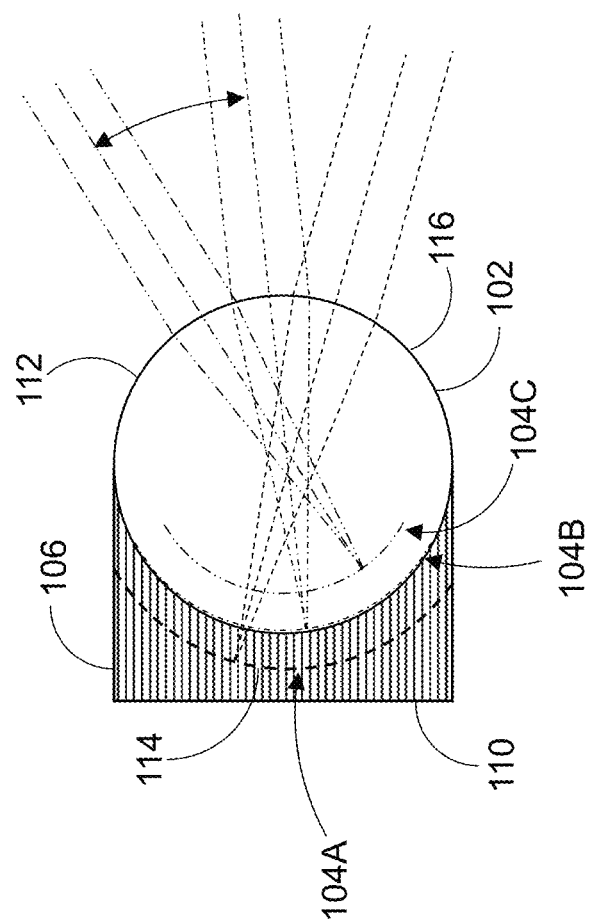
FIG. 13 shows a schematic of an individual lenslet of a 3D image projection system with different focal surfaces caused by chromatic aberrations.
Figure 14B:
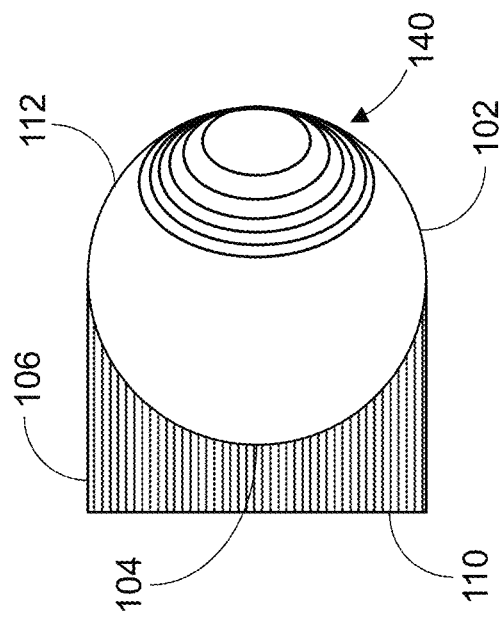
FIGS. 14A and 14B show a schematic of an individual lenslet of a 3D image projection system having a diffractive element according to an embodiment of the present disclosure.
Figure 14A:
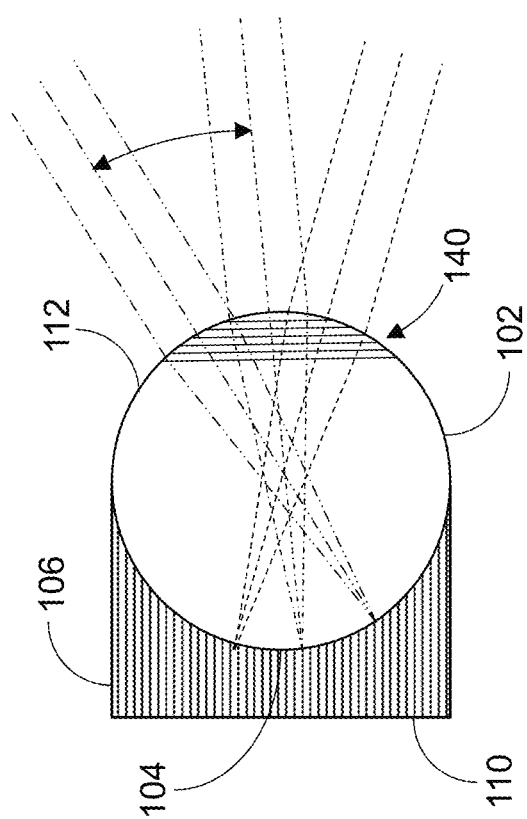

Referring now to FIG. 13, chromatic aberration in optical materials will result in different optical wavelengths having different (concentric) focal surfaces 104A, 104B, 104C. As illustrated in FIGS. 14A and 14B, in an embodiment, adding a diffractive element 140 on the front surface 116 of the individual lenslets 102 as described in Angel Flores et al., *Achromatic Hybrid Refractive Diffractive Lens with Extended Depth of Focus*, 43 Appl. Opt. 5618 (2004)—hereby incorporated by reference in its entirety—at least partially compensates for chromatic aberration in the lenslets 102.

Figure 15:
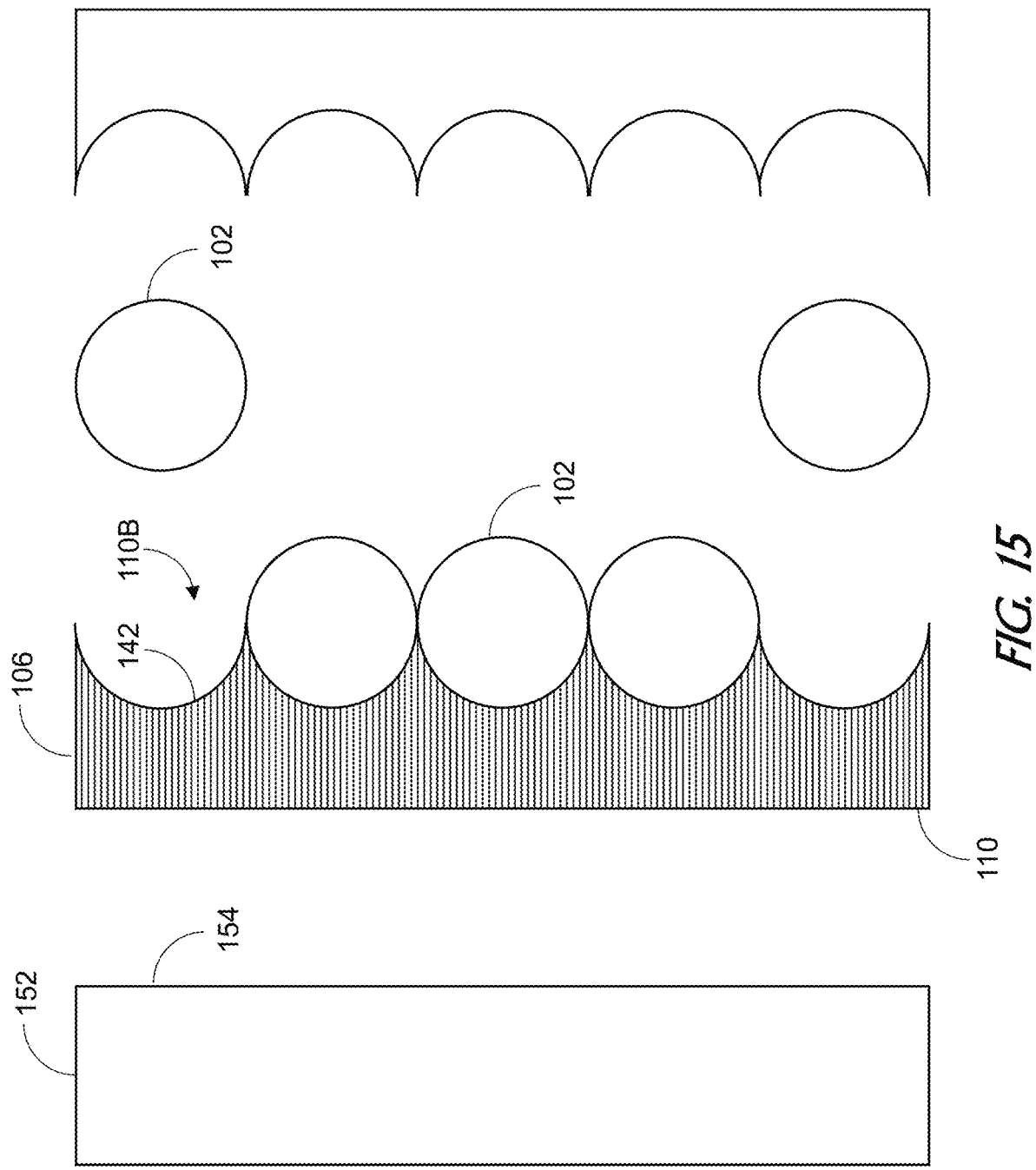
FIG. 15 shows a schematic of an apparatus and method of making a 3D light field converter according to an embodiment of the present disclosure.
Figure 16:
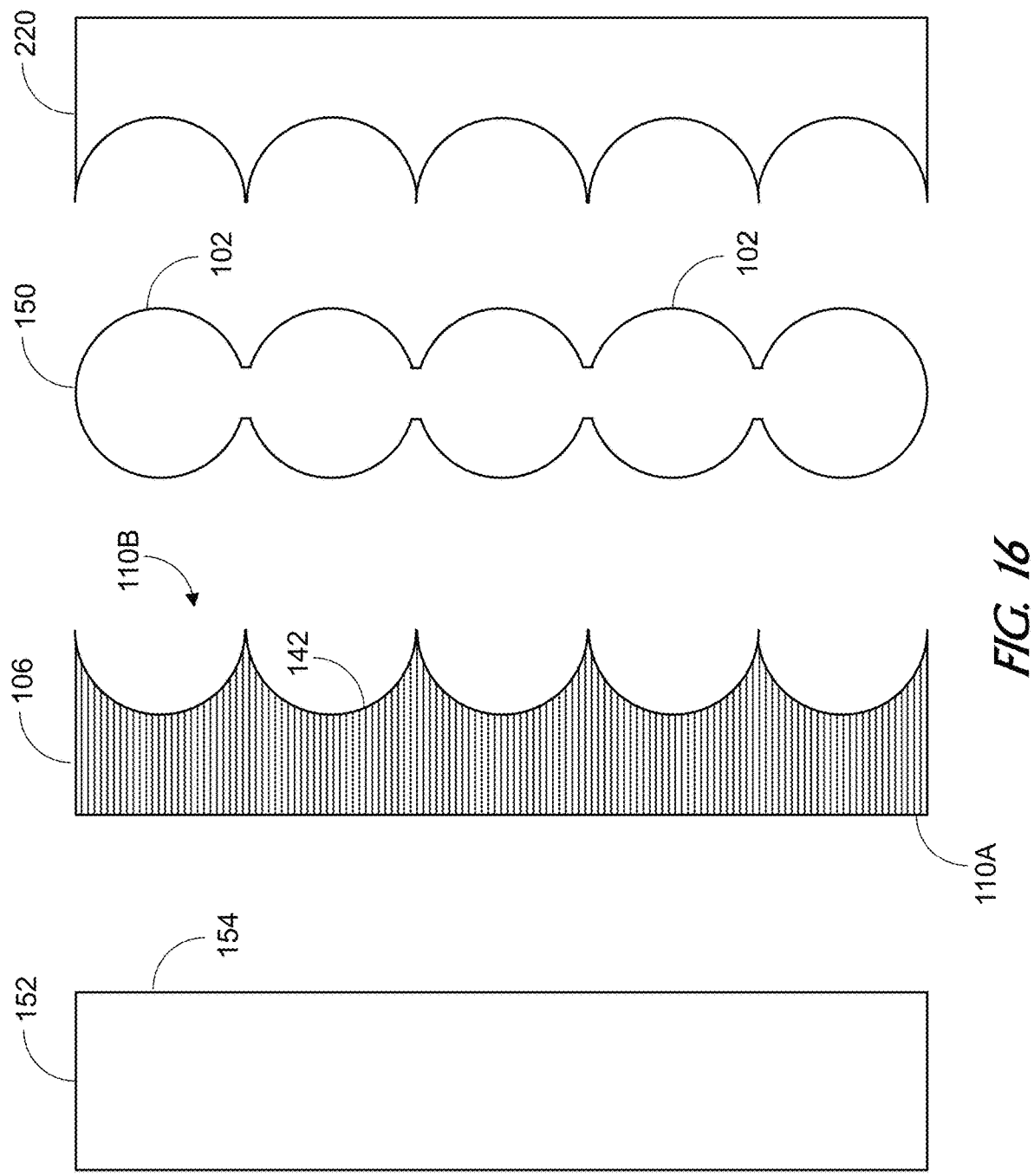
FIG. 16 shows a schematic of another apparatus and method of making a 3D light field converter according to an embodiment of the present disclosure.

As illustrated in FIG. 15, it is possible to make a 3D light field converter 100 by first making a fiber optic plate 106, then grinding or etching hemispherical pits 142 into one surface 110B of the fiber optic plate 106, and then placing the spherical lenslets 102 (individually or cast in an array) into the pits 142. However, this method of making a 3D light field converter can be time intensive. As illustrated in FIG. 16, in an embodiment, a method of forming a 3D light field converter 100 involves preparing the fiber optic plate 106 with pits 142, also referred to herein as hemispherical portions, then molding a lenslet array 150 onto the pitted surface 110B. The lenslets 102 can have the same or different radii on their inside and outside surfaces; and the lenslets 102 may also include diffractive elements 140 on their outside surfaces (see FIGS. 14A and 14B).

Figure 17:
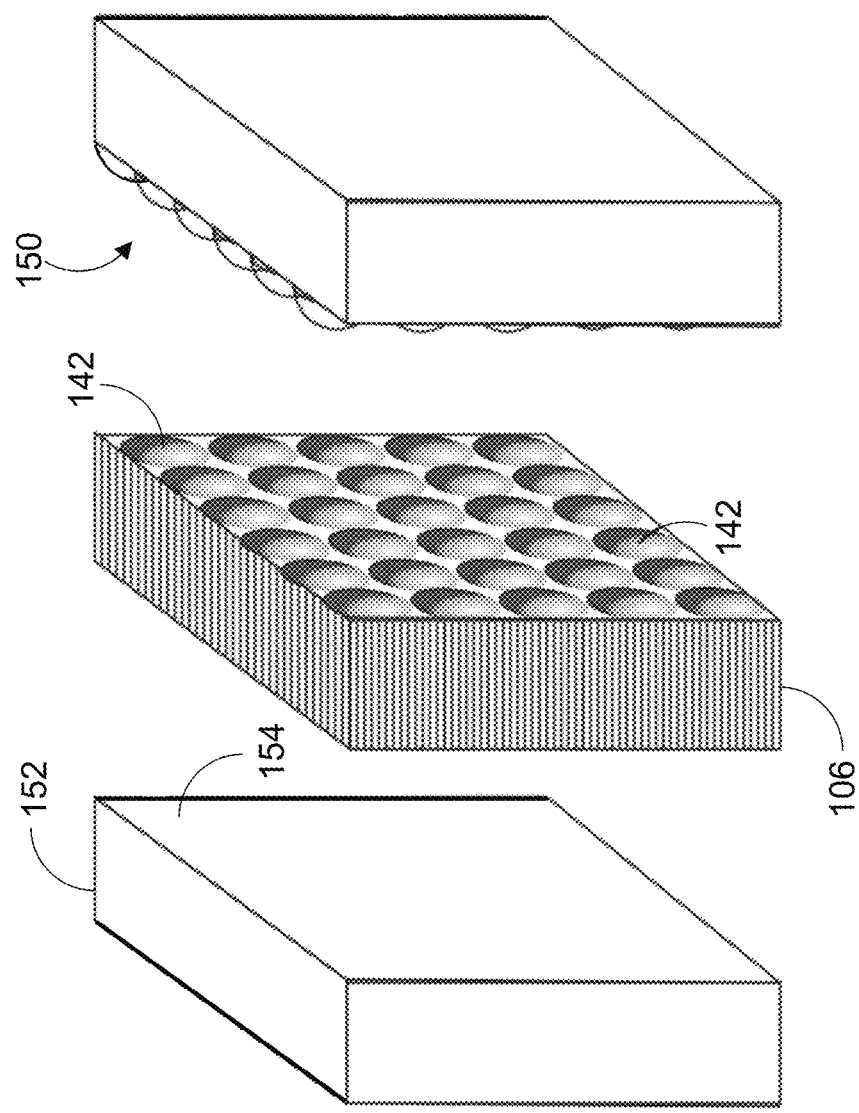
FIG. 17 shows a schematic of another apparatus and method of making a 3D light field converter according to an embodiment of the present disclosure.

As illustrated in FIG. 17, in an embodiment, a lenslet array 150 is molded onto a fiber optic plate 106 having pits 142.

Figure 18:
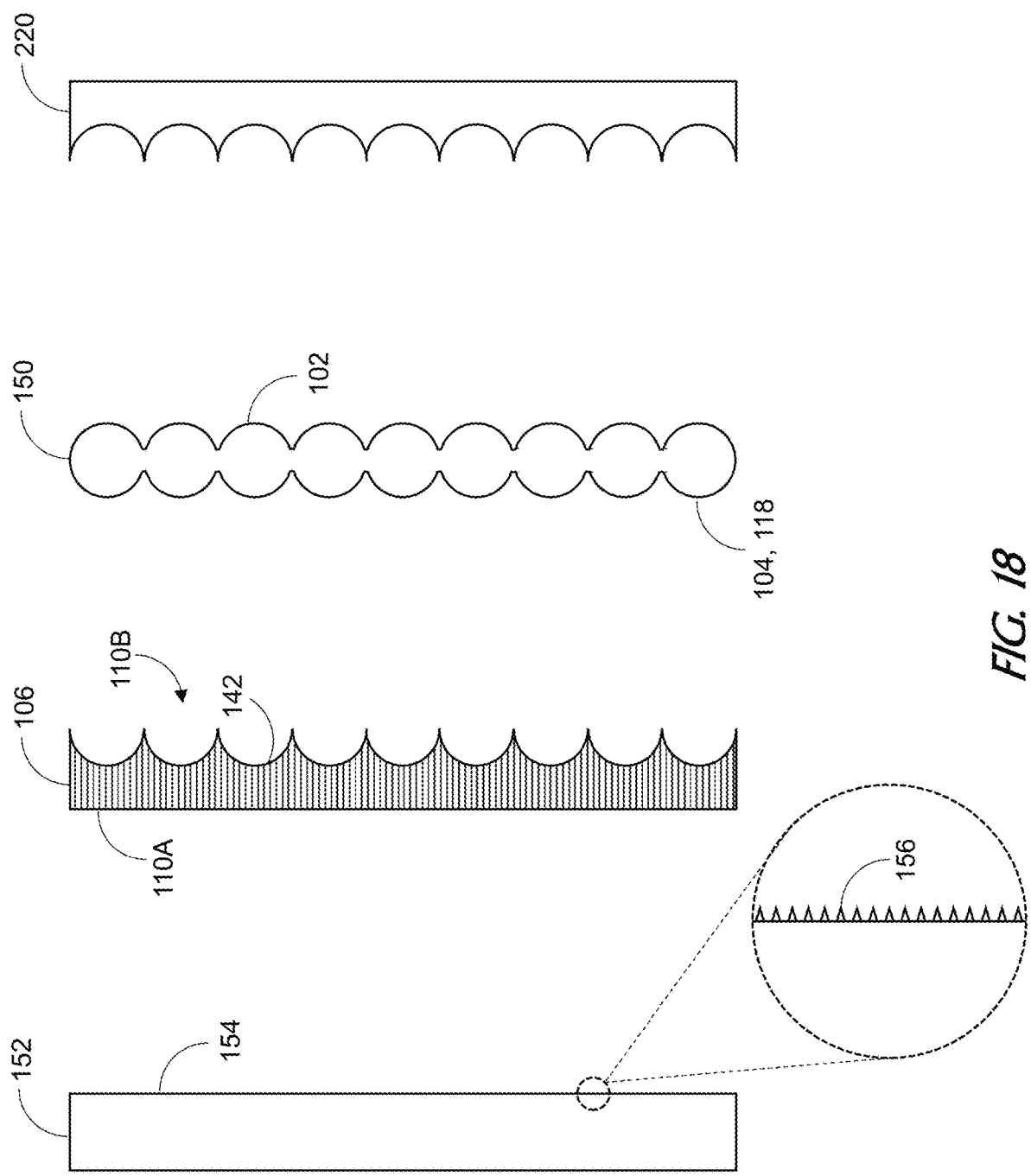
FIG. 18 shows a schematic of another apparatus and method of making a 3D light field converter according to an embodiment of the present disclosure.

As illustrated in FIGS. 18-20, in an embodiment, a fiber optic plate 106 is grown onto the focal surface 104 of a lenslet array plate 150. The fiber optic plate 106 is grown using a flat bottom mold 152 having a surface 154A including closely-spaced features 156 that serve as nucleation sites for a block copolymer to form an array of columns 158. The block copolymer is designed to produce cylindrical columns 158 of a size suitable for composing the fibers in the fiber optic plate 106, with each column 158 containing a high-index core and a lower-index sheath 160. The features 156 are spaced apart uniformly by a distance of 50 nanometers to 500 microns. In an example embodiment, the block copolymer is designed to form columns 158 with a diameter somewhat smaller than the spacing between columns 158. The columns 158 may also be referred to herein as fibers 158.

In an embodiment of the method for making a 3D light field converter 100, as illustrated in FIGS. 16 and 18, a templated flat-surface mold 152 is used to grow block copolymer light-guiding columns 158 from the flat templated surface 154 to the back surface 118 of a pre-molded lenslet array plate 150. The flat-surface mold 152 and any supporting structures are then removed and the 3D light field converter 100 is ready to use. The block copolymer should be designed so that it self-assembles into columns 158 with a high-index inner core of diameter in the range from 50 nanometers to 2 millimeters, and a lower-index cladding of thickness in the range from 100 nanometers to 1000 nanometers. Design, synthesis, and use of block copolymers to form self-assembled structures is described in Mingqi Li et al., *Block Copolymer Patterns and Templates*, 9 Materials Today 30, (2006)—hereby incorporated by reference in its entirety. A micron-scale view of block copolymer columns grown from a substrate is shown in FIG. 30 of Pallabi Samaddar et al., *An engineering insight into block copolymer self-assembly: Contemporary application from biomedical research to nanotechnology*, 342 Chemical Engineering Journal 71 (2018)—hereby incorporated by reference in its entirety.

Alternatively, it is possible to use other nanometer-scale self-assembly techniques to form the fiber plate. For example, DNA origami has been used as described by Jie Chao, Yunfeng Lin, Juajie Liu, Lianhui Wang, and Chunhai Fan, *DNA-based plasmonic nanostructures*, 18 Materials Today 326 (2015)—hereby incorporated by reference in its entirety—to construct 3D structures such as photonic crystals. DNA origami self-assembly may be controlled by a templated surface. Moreover, DNA origami methods can precisely position nanoparticles to ensure precise assembly of high- and low-index portions of a light-guiding column 158. A photo-curable resin can serve as a matrix to hold the columns 158 in position, or the DNA columns may be fixed in place by UV- or chemical-induced cross-linkage.

Yet another technique for making the fiber plate 106 is to use a positive-acting resist and e-beam, x-ray, or UV exposure to expose and etch vertical holes through the resist, then to fill the holes in the resist with relatively high-index material. In this case, it is advantageous to form the resist layer initially in a mold so that one surface is flat and the other surface conforms to a pre-formed lenslet array that will be mated to that other surface.

Referring now to FIGS. 16 and 18, a mold 220 for making the pre-molded lenslet array plate 150 may be made by the steps of:
1. using e-beam fabrication to construct reverse molds 220 for the inner and outer surfaces of the lenslet array plate 150;
2. filling the mold 220 with a curable resin;
3. curing the resin; and
4. removing the mold 220.

E-beam fabrication allows the shape, orientation, and position of each element of the mold surface to be controlled to a precision of a few nanometers. The curable resin may be a high-index material such as that described in Do Heung Kim et al., *One-step vapor-phase synthesis of transparent high refractive index sulfur-containing polymers*, 6 Sci. Adv. (2020)—hereby incorporated by reference in its entirety. For example, a high-index material may be any material with a refractive index of 1.5 or greater. Alternatively, it may be a more common UV curable resin impregnated with high-index nanoparticles such as described in Makoto Takafuji et al., *Preparation of High Refractive Index Composite Films Based on Titanium Oxide Nanoparticles Hybridized Hydrophilic Polymers*, 9 Nanomaterials (2019) 514—hereby incorporated by reference in its entirety. A combination of the Kim et. al. resin with high-index nanoparticles such as TiO2 or ZrO2 may reach an even higher refractive index. As indicated earlier, a refractive index of exactly 2.0 is ideal if spherical top and bottom surfaces of the lenslets 102 are desired to have the same radius. With a refractive index lower than 2.0, the inside surface 118 of the lenslet should have a larger radius than the outside surface 112, while with a refractive index higher than 2.0 the inside surface 118 of the lenslet 102 should have a smaller radius than the outside surface 112.

Referring now to FIGS. 19 and 20, in an example embodiment, after the columns 158 of the fiber optic plate 160 are formed, the sheaths 160 of the columns 158 are removed by a solvent, leaving an air gap between the high-index column cores. The 1.0 refractive index of air ensures that light will be well confined to the column 158 cores of the fiber optic plate 106.

As illustrated in FIGS. 18-20, the columns 158 are grown in a direction normal to the flat surface 154A, and terminate at, or very near, the lenslet back surface 118. Preferably, the columns 158 are parallel all the way from the flat surface 154A to the lenslet surface 118, but it can be acceptable for the columns 158 to curve as shown in FIG. 21.

Figure 22B:
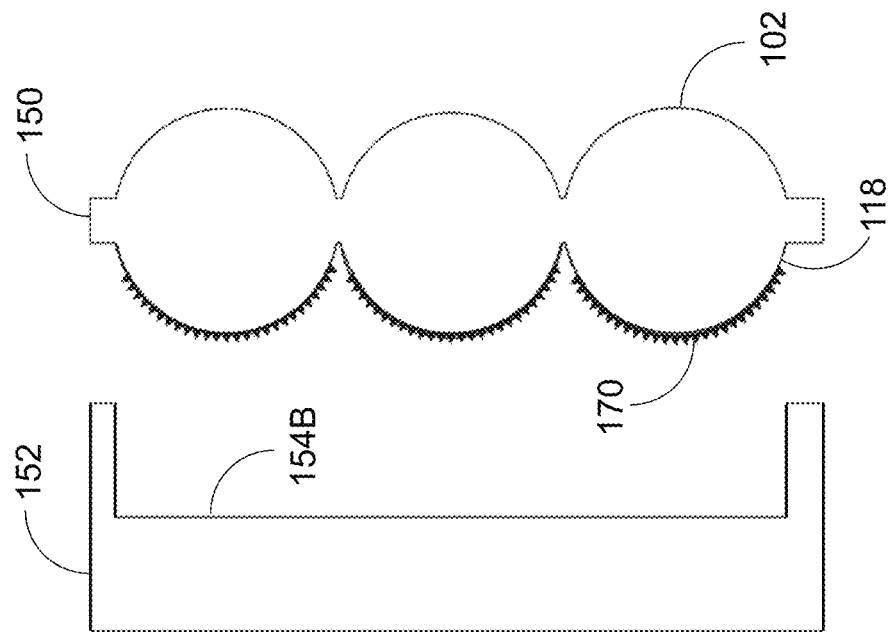
FIGS. 22A and 22B show a schematic of a portion of an apparatus and method of making curved fiber optic plate columns for a 3D light field converter according to an embodiment of the present disclosure.
Figure 22A:
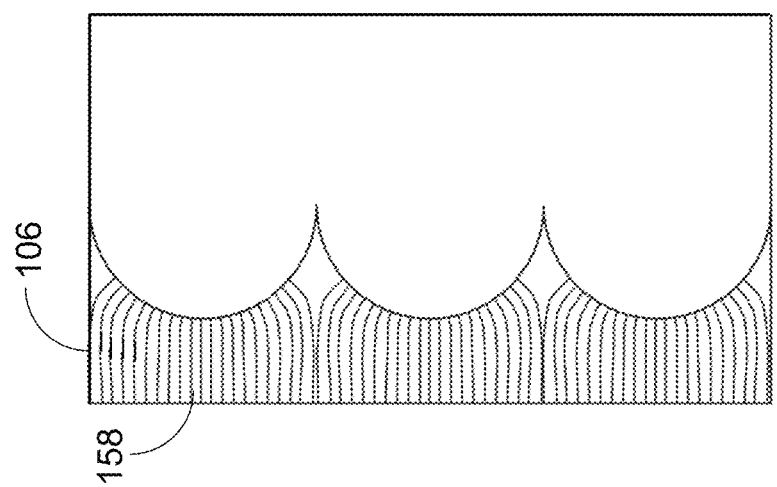

As illustrated in FIGS. 22A and 22B, in an embodiment, in order to grow curved columns/fibers 158 in a fiber plate 106, it is possible to grow self-assembled fibers 158 using the above-described methods (involving DNA origami, block copolymers, or similar methods), by molding closely-spaced features 170, also referred to herein as nucleation features, onto the back surfaces 118 of the lenslets 102 to nucleate fiber 158 growth. The fibers 158 grow initially from the back surfaces 118 of the lenslets 102. The fiber 158 growth direction, however, will typically turn toward a direction normal to a flat surface 154B of the mold 152 which defines the flat surface 110 of the fiber plate 106. An advantage of having the fibers 158 curved to be normal to both the lenslet 102 back surface 118 and the fiber plate flat surface 110 is that the fiber 158 density on the back surface of the lenslet array 150 may then be uniform, resulting in more uniform pixel density. If the fibers 158 remain normal to the flat surface 110 of the fiber plate 106 all the way to the back surface 118 of the lenslets 102, the fibers 158 near the periphery of the lenslets 102 will contact the lenslets 102 at a slant angle, and will therefore be elongated in the radial direction, resulting in a loss of resolution.

FIGS. 23A and 23B illustrate how the pixels 180 projected onto the flat surface 110A of the fiber optic plate 106 become rays 182 projected into the image-forming region 184 after passing through one lenslet 102. It is noteworthy that a) the resulting rays 182 from a single lenslet 102 form an image with no focal plane, b) the number of rays 182 can be no greater than the number of fibers 158 in contact with the back surface 118 of the lenslet 102, and c) the number of 2D image pixels focused onto the portion of the fiber plate's flat surface 110A corresponding to the lenslet 102 need not be greater than the number of fibers 158 in that region. Each fiber 158 transmits one image pixel, and each lenslet 102 displays the entire image. Also, it is noteworthy that there is some radial distortion of the flat (spatial) field relative to the angular field, but this is not a problem because it is easily compensated for in upstream image processing.

FIG. 23A illustrates how rays 182 projected into the image-forming space 184 by several lenslets 102 may converge to form a 3D real image R. Although FIG. 23A shows a real image R being formed, a virtual image V can be formed as illustrated in FIG. 23B. As shown in FIG. 23B, in virtual image generation, rays 182 diverge from points 180 on a virtual scene V rather than converge to points in a real scene R. Each lenslet 102 comprises a surface shape operable to direct corresponding groups of rays 182 at angles whose conical axes approximately converge toward the eyebox. Defining an optical axis through each fiber of the optical fiber plate 106, the spherical surface shapes of the lenslets 102 direct the groups of rays 182 at angles with respect to the optical axes of the fibers such that the groups of rays 182 converge or diverge towards the eyebox.

At first glance it may appear that calculating the correct array of 2D images to project onto the flat surface of the light field converter in order to form a desired 3D scene would be a daunting or computation-intensive challenge. However, it is efficiently accomplished by constructing a look-up table characterizing the behavior of the 3D light field converter 100.

Because every 3D object may be represented as a set of curves on a stack of planes in the image-forming region 184, and each such curve amounts to a set of points on a plane, and each such point may be traced back to a set of points on the flat side 110A of the 3D light field converter 100, it is possible and advantageous to construct the array of 2D images required to produce the 3D object by the following process:

1. construct a look-up table containing information corresponding to the locations of pixels that would appear on the flat surface 110A of the 3D light field converter plate 106 as a result of illuminating the lenslet-bearing surface 110B of the light field converter plate 106 from individual points on each of a plurality of parallel planes within the image forming region 184;
2. represent a 3D image as a set of such individual points; and
3. use the look-up table to determine the locations of pixels of 2D images to project via the projector system onto the flat surface 110A of the light field converter plate 106 so that the light field converter plate 106 will convert the array of 2D images into the 3D image.

Figure 24A:
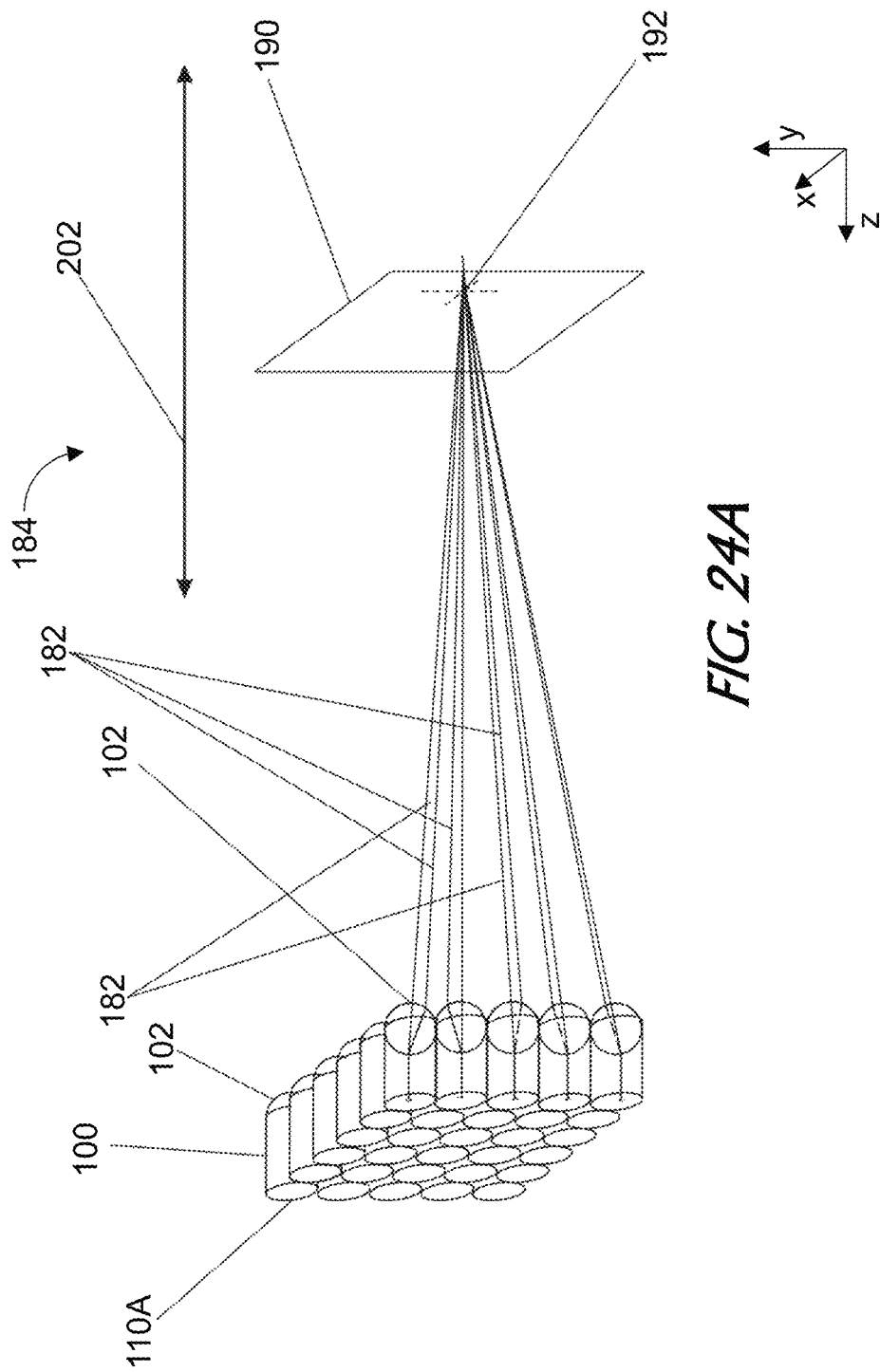
FIGS. 24A and 24B show a moveable array of light sources located in the image-forming region of a 3D light converter according to an embodiment of the present disclosure.

As illustrated in FIG. 24A, a moveable array 190 of light sources 192 is placed in the image-forming region 184 of the 3D light converter 100. The light field converter 100 converts the light field from any light source 192 in the light source array 190 into an array of 2D images on the flat side 110A of the light converter fiber plate 106. Locations of the resulting pixels in those 2D images are recorded, along with the X, Y, and Z-coordinate locations of the corresponding light sources 192, to construct a real-to-2D lookup table.

Figure 24B:
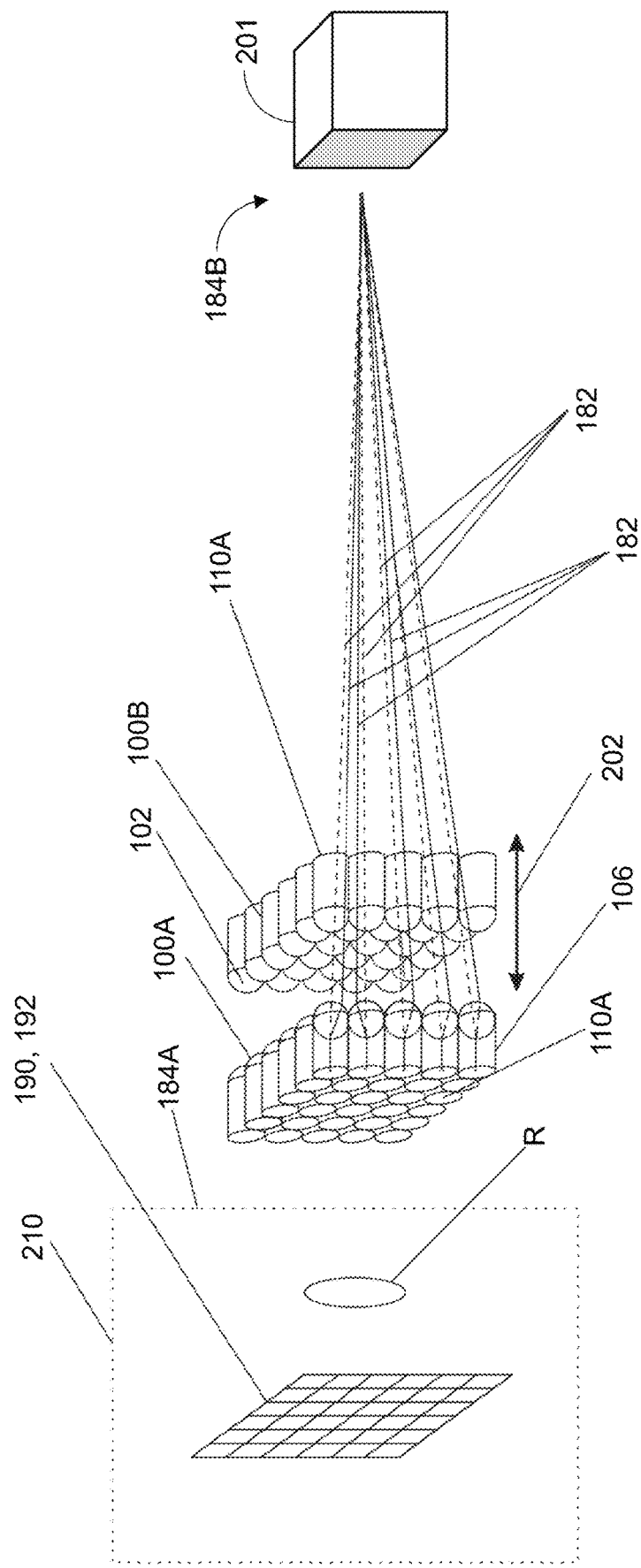

As illustrated in FIG. 24B, a first light field converter 100A is used to construct real images R of point sources 192 in its image-forming region 184A, and a second light field converter 100B is used to convert the light rays 182 corresponding to each point source 192 to a set of 2D pixels on the flat face 110A of the second light field converter 100B, from which a second lookup table is constructed. In an embodiment, a camera 201 is utilized for recording the 2D pixel locations. In an example embodiment, recording the set of 2D images is accomplished by a photodetector array (e.g., camera 201) placed in close proximity to the flat surface 110A of the light field converter's 100B fiber optic plate 106.

The physical aspect of this process is illustrated in FIGS. 24A and 24B. In FIG. 24A, light source 192 on light source array 190 is movable along a Z-axis using a transport mechanism/actuator 202 represented by a double-ended arrow. The locations of pixels appearing on the flat surface 110 of the light field converter 100 are recorded in a look-up table, for coordinates of the light sources 192 in the light source array at each Z-coordinate position.

In FIG. 24B, 3D light field projector light source array 190 projects a 2D image array, computed from the look-up table and corresponding to a 3D real object located at a first location 210. The light field propagates from the lenslet 102 side 110B of the second 3D light field projector 100B to form a real image of the 3D real object at a second location 184B. There is sufficient information in the look-up table to calculate the pattern of pixels that appear on the flat surface 110A of the first, substantially identical, 3D light field projector 100A located adjacent to the second 3D light field projector 100B. However, it is also possible to do the calculation optically, and extremely fast, by physically building the setup illustrated in FIG. 24B and directly recording the new pixel pattern that appears on flat surface 110A of the first 3D light field projector 100A. This new pixel pattern, if projected through the second 3D light field projector 100B, projects a virtual image viewable in the image-forming region 184A.

Instead of generating a full 3D image at each possible z-position in space (which would be prohibitive from a computational standpoint), FIG. 24B utilizes a second 3D light field converter 100B, which is arranged opposite the first 3D light field converter 100A, to decode the angular encoding of the 2D images emitted from the first 3D light field converter 100A. Thus, the position of the flat surface 110A of the second 3D light field converter 100B will display (for recording by the camera 201) the pixel values of the sets of 2D images needed to reproduce the 3D image at that particular z-position. This process can be repeated at different z-positions to record additional lookup tables representative of additional sets of 2D images at the different z-positions. These values can then be combined to form all the necessary points to generate the 3D image along the range of z-position values. In other words, the second 3D light field converter 100B is operable to decode the image information encoded by the first 3D light field converter 100A.

Because each point on a 3D object corresponds to a set of 3D coordinates, such as the Z-coordinate, X-coordinate, and Y-coordinate, and because it is simple to represent all of the information in the look-up table as a 3D table, it may be extremely fast and efficient to look up the 2D pixel locations corresponding to each point on a 3D object and write them into a buffer (e.g., a portion of random-access memory (RAM)). When all of the desired points on the 3D object have thus been converted to pixels in the buffer, the buffer contains the entire 2D image array that, when projected onto the flat surface 110 of the 3D light field converter 100, will generate the desired 3D object in the image-forming region 184.

Performing the above process can be done at video rates using currently commercially available personal computer hardware. Parallelizing the process, e.g., by using multiple buffers for different subsets of the lenslets 102 or different portions of the 3D image, then adding the buffer contents after the buffers are filled, can greatly speed up the process.

Performing the process optically as described in connection with FIGS. 24A and 24B may speed the process even more.

Referring now to FIGS. 24A and 24B, in an embodiment, the method for calculating 2D image arrays for conversion by the 3D light field converter 100 into 3D images in the image-forming region 184, includes the steps of:

1. providing a first 3D light field converter 100A and a high pixel count camera 201;
2. recording, with the camera 201, an image of the light emitted by the flat surface 110 of the first 3D light field converter 100A;
3. providing a planar array 190 of light sources 192 in the image-forming region 184 of the first 3D light field converter 100A, with each light source 192 in the array individually addressable;
4. providing an actuator operable to change the distance between the planar array 190 of light sources 192 and the first 3D light field converter 100A;
5. recording, with the camera 201, either serially or in parallel, the 2D light patterns formed for each light source 192 and the z-distance to the flat surface 110 of the first 3D light field converter 100A;
6. providing a second 3D light field converter 100B in the image-forming region of the first 3D light field converter 100A, wherein an actuator is operable to change the distance between the first and second 3D light field converters 100A, 100B. The second 3D light field converter 100B is oriented opposite the first 3D light field converter 100A such that the lenslets 102 of each the first and second 3D light field converters 100A, 100B are proximal;
7. recording, by the camera 201, the locations of rays 182 on the flat surface 110A of the second 3D light field converter 100B corresponding to the rays 182 in a virtual image of a point source 192, wherein the second 3D light field converter 100B receives rays 182 that would form a real image if they were allowed to continue undiverted through and beyond the second 3D light field converter 100B;
8. converting to a second lookup table the recorded locations of the rays 182 on the flat surface 110A of the second 3D light field converter 100B corresponding to the pixels in the array of 2D images which, when projected onto the flat surface 110A of the second light field converter 100B, will be transformed into a light field that forms a virtual image of the point source;
9. constructing a desired 3D virtual image in the image-forming region 184B of the second 3D light field converter 100B.

The physical steps above have the advantage of providing exact results for a given 3D light field converter 100, whereas any mathematical description of a 3D light field converter 100 will be unavoidably inexact, and may not account for slight differences that can occur in manufacturing individual 3D light field converters 100. Using two 3D light field converters 100A, 100B allows simulation of the 2D images needed to produce a 3D image focused at the camera 201 location. As illustrated in FIG. 24B, a plurality of 2D images are formed at the light source array 190. The 2D images are incident upon the flat surface 1101 of the 3D light field converter 100A. Light is transmitted through the 3D light field converter 100A toward a focal point in the image-forming region 184B. A second 3D light field converter 100B is located in the path of the light at a fixed distance (e.g., z-position) from the first 3D light field converter 100A, and the distance between the two 3D light field converters changes the focal depth of the 2D images formed on the back surface 110A of the second 3D light field converter 100B. The 2D pixel locations are recorded by the camera 201 from which a second lookup table is constructed. Some combination of the first lookup table values and the second lookup table values may then be used to form a 3D image through the light source array 190. In an example embodiment, at least first, second, and third lookup tables are constructed corresponding to first, second, and third positions of the second 3D light field converter 100B from the first 3D light field converter 100A.

Figure 25:
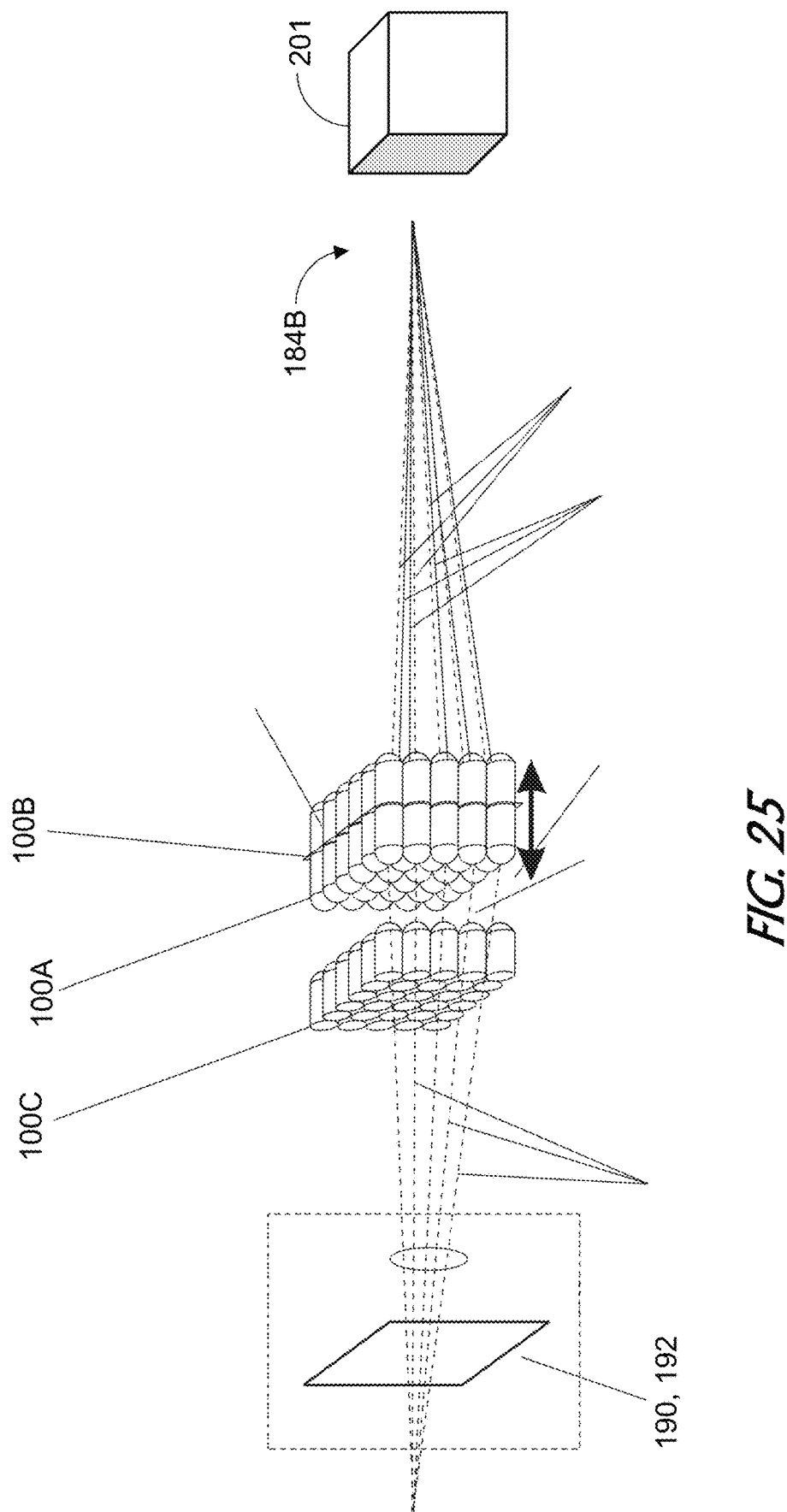
FIG. 25 shows a schematic of a fully hardware-based method that can be used to obtain the desired lookup table in a single step without needing to record intermediate data according to an embodiment of the present disclosure.

Alternatively, as illustrated in FIG. 25, a method can be used to obtain the desired lookup table in a single step without needing to record intermediate data. A movable planar array 190 of light sources 192 may be moved relative to a first 3D light field converter 100A sandwiched with a second 3D light field converter 100B, resulting in re-projection of the light fields of the light sources 192 into image forming space 184B. The third 3D light field converter 100C converts the virtual 3D source images into 2D pixel arrays on its back face 110A, and the 2D pixel arrays are recorded by camera 201 for interpretation as data for the lookup table. Thereby, a complete table that relates virtual source position to 2D pixel positions in the 2D array can be built up easily. A non-planar array of light sources may be used, but is mathematically and physically less convenient.

FIG. 26 illustrates one approach to constructing the lookup table in a parallel fashion. Each row in the source array is processed separately in parallel, then the results are combined in a parallel binary tree.

Figure 27:
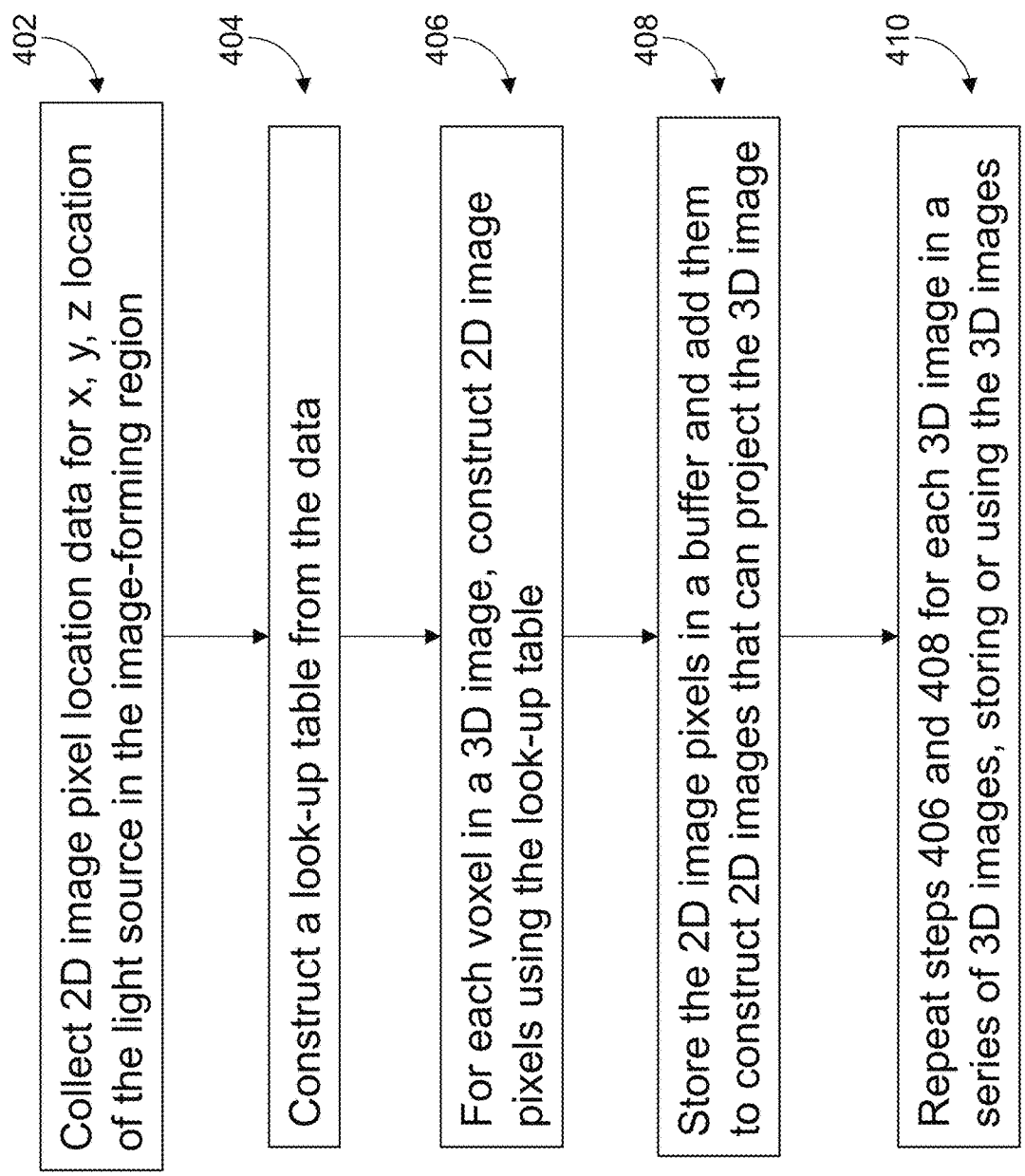
FIG. 27 shows a flow chart of an approach to constructing a 3D real or virtual image in a parallel fashion utilizing a 3D light field converter according to an embodiment of the present disclosure

FIG. 27 illustrates one approach to constructing a 3D real or virtual image in a parallel fashion. In a first step 402, a set of x, y, z-coordinates of source points representing a 3D virtual image is used to extract corresponding sets of 2D image pixel coordinates (corresponding to pixel points on the flat face of light field converter). In a second step 404, a sub-table is constructed for each plane in the image forming space. In a third step 406, for each voxel in the 3D virtual image, 2D image pixels are constructed via the sub-tables. In a fourth step 408, pixel data accumulated in the sub-tables is combined in buffers via a binary tree method for high speed parallel computation, and 2D images are constructed that can project the 3D image. In a fifth step 410, the third and fourth steps 406, 408 are repeated for each 3D image in a series of 3D images.

Figure 28:
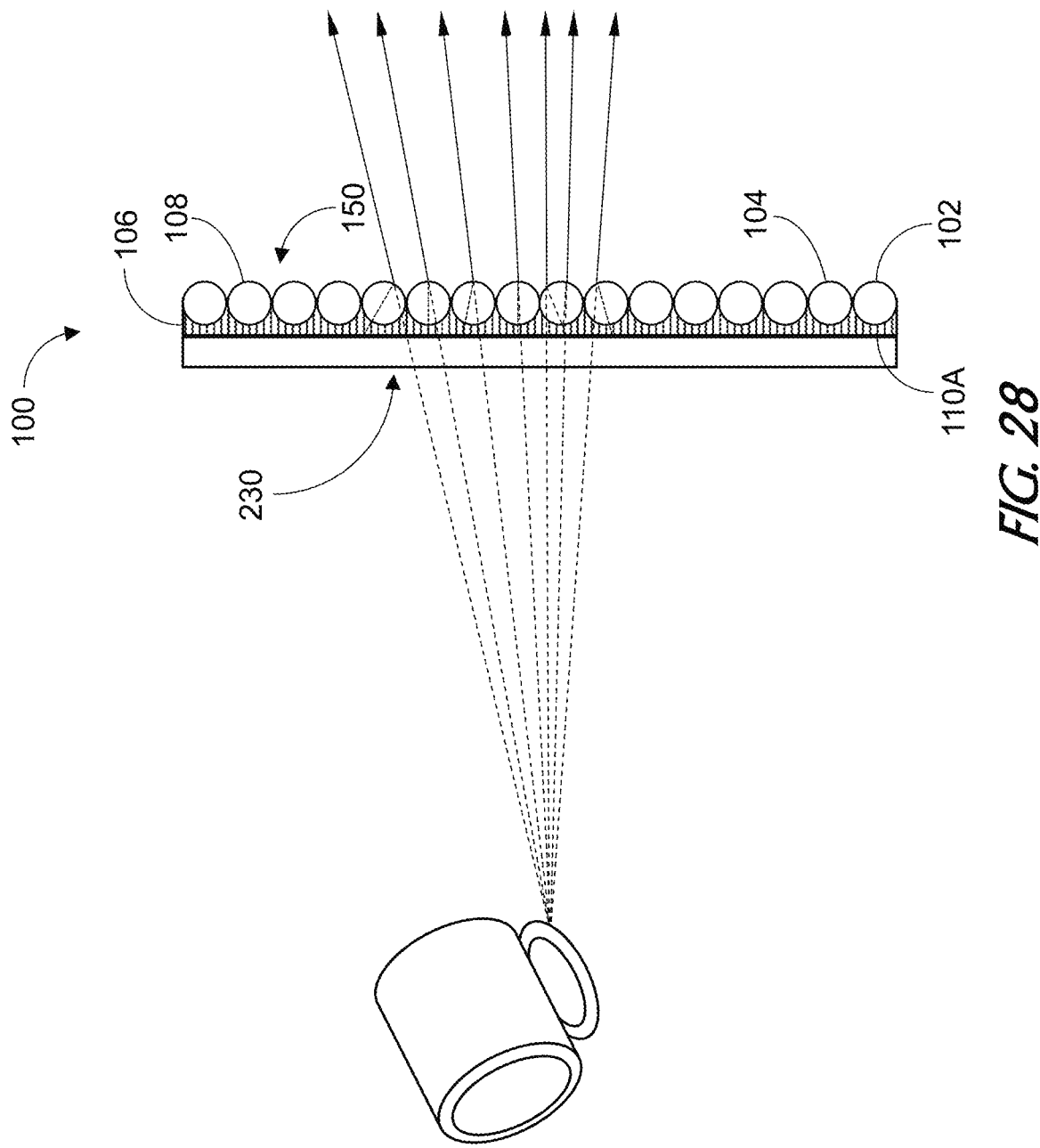
FIG. 28 shows a schematic of a light-emitting display having a light field converter including a spherical lenslet array as cover plate according to an embodiment of the present disclosure.

As illustrated in FIG. 28, in an embodiment, the fiber optic plate 106 and the lenslet array 150 may be operable as a cover plate for a light-emitting display 230. Many display devices require a cover plate, and conventional cover plates may be replaced by the optical fiber plate 106. In an embodiment, the light-emitting display 230 comprises a charge-coupled device (CCD). In another embodiment, the light-emitting display 230 comprises a complementary metal-oxide-semiconductor (CMOS).

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An image display device, comprising:
a light-emitting pixel array operable to emit a plurality of two-dimensional images each comprising a plurality of pixels; and
a light field converter comprising a coherent optical fiber plate including a plurality of optical fibers, wherein the optical fiber plate has a first surface and a second surface, and an array of lenslets arranged along the second surface, wherein each lenslet of the array of lenslets includes a spherical surface in contact with one or more ends of the plurality of optical fibers, wherein each lenslet of the array of lenslets is configured to have a focal surface conforming to the second surface of the optical fiber plate;
wherein the light field converter is operable to transform pixels from each of the plurality of two-dimensional images into corresponding diverging rays;
wherein the diverging rays form a virtual three-dimensional image in an image-forming region.

2. The image display device of claim 1, wherein each lenslet has a refractive index operable to conform the focal surface to the spherical surface of each lenslet.

3. The display device of claim 2, wherein each lenslet comprises a portion of a spherical microlens having a refractive index of substantially 2.0.

4. The display device of claim 2, wherein each lenslet comprises a diffractive structure on the spherical surface optically adjacent to the image-forming region, wherein the diffractive structure is configured to conform a focal surface of each of a plurality of wavelengths of light to the spherical surface of each respective lenslet, wherein the diffractive structure is operable to correct at least a portion of chromatic aberrations caused by a material of the lenslet.

5. The display device of claim 2, wherein each lenslet comprises a portion of a spherical microlens having a refractive index less than 2.0, wherein a spherical surface of each lenslet in contact with the plurality of optical fibers comprises a larger radius than a spherical surface of each lenslet in contact with air.

6. The display device of claim 2, wherein each lenslet comprises a portion of a spherical microlens having a refractive index greater than 2.0, wherein a spherical surface of each lenslet in contact with the plurality of optical fibers comprises a smaller radius than a spherical surface of each lenslet in contact with air.

7. The image display device of claim 1, further comprising a lens system configured to convey the plurality of two-dimensional images to the coherent optical fiber plate.

8. The image display device of claim 1, wherein the light-emitting pixel array comprises a charge-coupled device or complementary metal-oxide-semiconductor, wherein the coherent optical fiber plate and the array of lenslets are configured as a cover plate for the light-emitting pixel array.

9. The image display device of claim 1, wherein the light-emitting pixel array is directly connected with the first surface of the optical fiber plate.

10. The image display device of claim 1, wherein the array of lenslets comprises hexagonal lenslets.

11. A method for projecting three-dimensional images, comprising:
providing a light-emitting pixel array operable to emit a plurality of two-dimensional images each comprising a plurality of pixels;
providing a first light field converter comprising a first coherent optical fiber plate, wherein the first optical fiber plate has a first surface and a second surface, and a first array of lenslets arranged along the second surface, wherein each lenslet of the first array of lenslets includes a spherical surface in contact with one or more ends of the plurality of optical fibers, wherein each lenslet of the first array of lenslets is configured to have a focal surface conforming to the second surface of the first optical fiber plate;
wherein the first light field converter is operable to transform pixels from each of the plurality of two-dimensional images into corresponding diverging rays;
wherein the diverging rays form a virtual three-dimensional image in an image-forming region;
constructing a first look-up table containing information corresponding to locations of the plurality of pixels on the first surface of the first optical fiber plate as a result of illuminating the second surface of the first optical fiber plate from individual points at a plurality of parallel planes within the image-forming region;
representing a three-dimensional image as a set of the individual points; and
using the look-up table to determine the locations of the plurality of pixels of the two-dimensional images to project via the light-emitting pixel array onto the first surface of the first optical fiber plate, whereby the first optical fiber plate is operable to convert the plurality of two-dimensional images into the three-dimensional image.

12. The method of claim 11, further comprising constructing a series of the plurality of two-dimensional images to provide a three-dimensional video sequence.

13. The method of claim 12, wherein at least one of the three-dimensional images of the three-dimensional video sequence is confined to a single plane within the image-forming region.

14. The method of claim 11, further comprising:
providing a second light field converter comprising a second coherent optical fiber plate, wherein the second optical fiber plate has a first surface and a second surface, and a second array of lenslets arranged along the second surface, wherein the second array of lenslets is configured to have a focal surface conforming to the first surface of the second optical fiber plate;
wherein the second light field converter is arranged to mirror the first light field converter, and wherein the second light field converter is operable to transmit the plurality of rays and display the two-dimensional images on the first surface of the second optical fiber plate at a first distance from the first light field converter;
constructing a second look-up table containing information corresponding to locations of the plurality of pixels of the displayed two-dimensional images on the first surface of the second optical fiber plate at the first distance;
representing a three-dimensional image as a set of the individual points; and
using the first or second look-up table to determine the locations of the plurality of pixels of the two-dimensional images to project via the light-emitting pixel array onto the first surface of the first optical fiber plate, whereby the first optical fiber plate is operable to convert the plurality of two-dimensional images into the three-dimensional image.

15. The method of claim 14, wherein the two-dimensional images correspond to different perspective views of the three-dimensional image.

16. The method of claim 14, further comprising translating the second light field converter to a second distance from the first light field converter, constructing a third look-up table containing information corresponding to locations of the plurality of pixels of the displayed two-dimensional images on the first surface of the second optical fiber plate at the second distance.

17. The method of claim 16, further comprising averaging or combining the values from the second and third look-up tables to generate the three-dimensional image.

18. A method of fabricating an image display device, comprising:
- providing a coherent optical fiber plate with a thickness between 10.0 millimeters and 0.05 millimeters, wherein the optical fiber plate has a first surface and an opposing second surface;
- subtracting an array of hemispherical portions from the second surface of the optical fiber plate, wherein each of the hemispherical portions has a radius of curvature corresponding to a radius of curvature of a lenslet in an array of lenslets;
- providing a first mold portion having an array of hemispherical portions corresponding to the array of hemispherical portions in the second surface of the optical fiber plate;
- using the second surface of the optical fiber plate as a second mold portion;
- molding a high refractive index element having a surface adhered to the second surface of the optical fiber plate, wherein the high refractive index element forms an array of lenslets matingly engaged with the array of hemispherical portions in the optical fiber plate, wherein each lenslet of the array of lenslets is configured to have a focal surface conforming to the second surface of the optical fiber plate, and wherein the high refractive index element comprises a photo-curable resin impregnated with high refractive index nanoparticles;
- providing a light-emitting pixel array operable to emit a plurality of two-dimensional images each comprising a plurality of pixels;
- wherein the coherent optical fiber plate and the array of lenslets are operable to transform pixels from each of the plurality of two-dimensional images into corresponding diverging rays, wherein the diverging rays form a virtual three-dimensional image in an image-forming region.

19. A method of fabricating an image display device, comprising:
- providing a bottom mold having an array of nucleation features 0.1 nanometers to 50.0 nanometers high and spaced at a distance of 5.0 nanometers to 10.0 microns;
- providing a top mold comprising an array of lenslets;
- applying a layer of block copolymer between the bottom mold and the top mold, the block copolymer configured to self-assemble into columns perpendicular to a surface of the bottom mold having the nucleation features and connected to the array of lenslets,
- wherein the columns form a fiber structure of the optical fiber plate,
- wherein each lenslet of the array of lenslets includes a spherical surface in contact with one or more ends of the plurality of optical fibers, wherein each lenslet of the array of lenslets is configured to have a focal surface conforming to the second surface of the optical fiber plate;
- providing a light-emitting pixel array operable to emit a plurality of two-dimensional images each comprising a plurality of pixels;
- wherein the coherent optical fiber plate and the array of lenslets are operable to transform pixels from each of the plurality of two-dimensional images into corresponding diverging rays, wherein the diverging rays form a virtual three-dimensional image in an image-forming region.

20. The method of claim 19, wherein each column comprises a rigid high-index core with a lower-index sheath, the method further comprising applying a solvent to the optical fiber plate to remove the sheath forming an air gap between the columns.

* * * * *